(12) United States Patent
Blanche

(10) Patent No.: US 12,529,936 B1
(45) Date of Patent: Jan. 20, 2026

(54) WAVEGUIDE COMBINER WITH MULTIPLE IMAGE PLANES

(71) Applicant: Amazon Technologies, Inc., Seattle, WA (US)

(72) Inventor: Pierre-Alexandre Blanche, Tucson, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 370 days.

(21) Appl. No.: 17/992,131

(22) Filed: Nov. 22, 2022

(51) Int. Cl.
*G02F 1/295* (2006.01)
*G02B 27/01* (2006.01)

(52) U.S. Cl.
CPC ....... *G02F 1/2955* (2013.01); *G02B 27/0103* (2013.01); *G02B 2027/0112* (2013.01); *G02B 2027/0127* (2013.01)

(58) Field of Classification Search
CPC ... G02F 1/2955; G02F 1/295; G02B 27/0103; G02B 2027/0112; G02B 2027/0127
See application file for complete search history.

(56) References Cited

U.S. PATENT DOCUMENTS

| | | | |
|---|---|---|---|
| 9,494,799 B2 | 11/2016 | Robbins et al. | |
| 9,575,366 B2 | 2/2017 | Srivastava et al. | |
| 10,750,145 B1 | 8/2020 | Shipton et al. | |
| 11,333,893 B1 | 5/2022 | Draper et al. | |
| 2015/0309263 A2 | 10/2015 | Abovitz et al. | |
| 2018/0275350 A1* | 9/2018 | Oh | G02B 5/1842 |
| 2020/0158943 A1 | 5/2020 | Calafiore | |
| 2022/0206295 A1* | 6/2022 | Calafiore | G02B 27/0101 |
| 2022/0207156 A1 | 6/2022 | Satpathy et al. | |
| 2023/0176379 A1 | 6/2023 | Amirsolaimani et al. | |
| 2023/0176380 A1 | 6/2023 | He et al. | |
| 2023/0367833 A1 | 11/2023 | Kol et al. | |

FOREIGN PATENT DOCUMENTS

| | | |
|---|---|---|
| CN | 217693558 U | 10/2022 |
| WO | 2023007477 A2 | 2/2023 |

OTHER PUBLICATIONS

Blanche, U.S. Appl. No. 17/888,912, "Waveguide Combiner With Dynamic Grating Activation," filed Aug. 16, 2022.

(Continued)

*Primary Examiner* — Jennifer Doan
(74) *Attorney, Agent, or Firm* — Kilpatrick Townsend & Stockton LLP

(57) ABSTRACT

Waveguide combiners with multiple image planes are described herein. In an example, an apparatus includes a first optical element configured to receive light, a substrate having an input surface and an output surface and configured to propagate the light received by the first optical element along a propagation path within the substrate, and a second optical element configured to output the light propagated along the propagation path. The input surface of the substrate is coupled to the first optical element. The second optical element includes a first diffraction grating coupled to the output surface and characterized by a first focal distance and a second diffraction grating coupled to the first diffraction grating in a stacked arrangement and characterized by a second focal distance.

20 Claims, 13 Drawing Sheets

(56) References Cited

OTHER PUBLICATIONS

Bigler et al., "Holographic Waveguide HUD with in-line Pupil Expansion and 2D FOV Expansion," Applied Optics, vol. 58, Nov. 13, 2019, 11 pages.

Draper et al., "Examining Aberrations Due to Depth of Field in Holographic Pupil Replication Waveguide Systems," Applied Optics, vol. 60, No. 6, Feb. 20, 2021, pp. 1653-1659.

Draper et al., "Holographic Curved Waveguide Combiner for HUD/AR with 1-D Pupil Expansion," Optics Express, vol. 30, No. 2, Jan. 11, 2022, pp. 2503-2516.

Draper et al., "Holographic Waveguide Head-up Display With 2-D Pupil Expansion and Longitudinal Image Magnification," Applied Optics, vol. 58, No. 5, Feb. 4, 2019, 15 pages.

Fan et al., "Switchable Liquid Crystal Grating With Sub Millisecond Response," Applied Physics Letters, vol. 100, No. 11, Mar. 12, 2012, pp. 111105-1-111105-4.

\* cited by examiner

WAVEGUIDE COMBINER WITH MULTIPLE IMAGE PLANES

BACKGROUND

Image displays, including near-eye displays, have been utilized in different mixed reality systems including, for instance, augmented reality systems and heads-up display systems. In a mixed reality system, an image can be displayed to a user from a light projector onto a light transparent display that allows the user to also view the real world.

BRIEF DESCRIPTION OF THE DRAWINGS

Various embodiments in accordance with the present disclosure will be described with reference to the drawings, in which.

DETAILED DESCRIPTION

Figure 1:
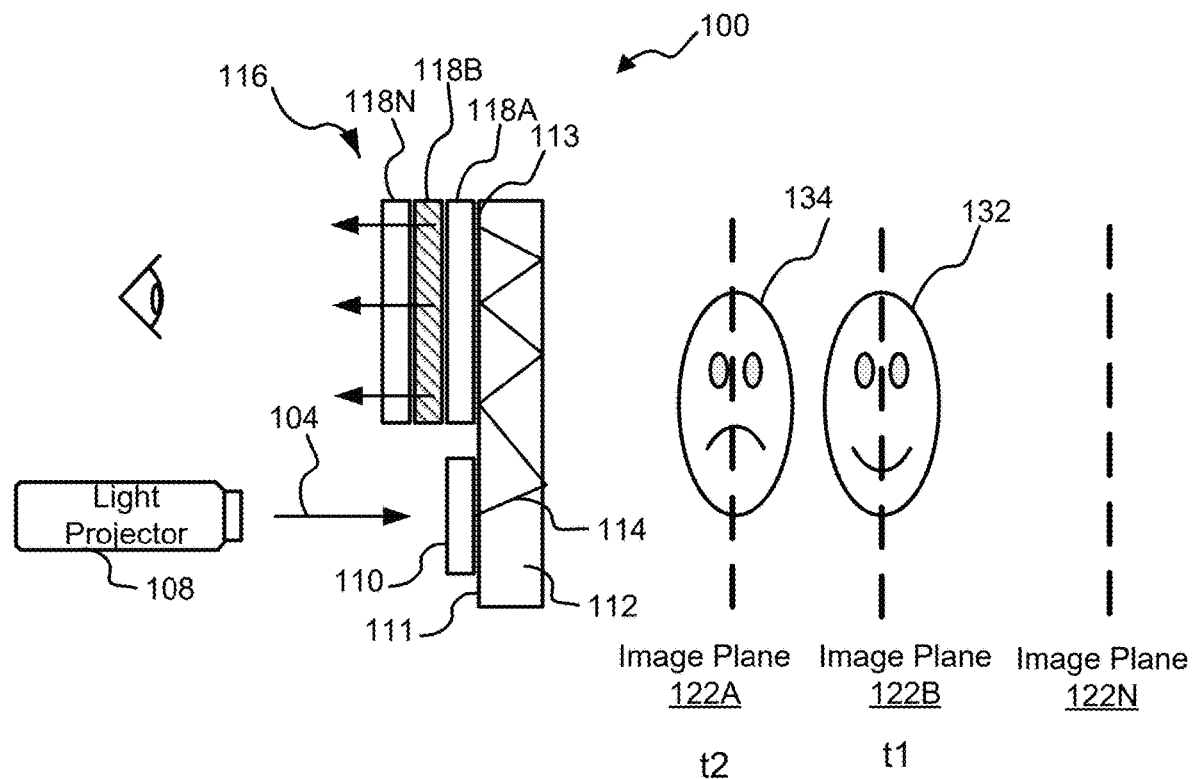
FIG. 1 illustrates examples of an optical waveguide combiner with multiple image planes in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an optical system that includes a waveguide combiner supporting dynamic grating activation. The optical system can be used in a mixed reality system including, for instance, an augmented reality system or heads-up display system. The dynamic grating activation enables the projection of images at different image planes, thereby providing a depth perception to a user of the optical system by mean of both vergence and accommodation. In an example, the waveguide combiner includes a first optical element that receives light from a light source. This first optical element can be an in-coupling holographic optical element (HOE). The waveguide combiner also includes a substrate that is coupled to the first optical element and that propagates, along a propagation path within the substrate, the light received by the first optical element. The waveguide combiner also includes a second optical element that is coupled to an output surface of the substrate and that outputs, from the waveguide combiner, the light propagated along the propagation path. This second optical element can be an out-coupling HOE that includes multiple diffraction gratings disposed in a stacked arrangement. Each of these diffraction gratings is characterized by a focal distance that is different from focal distances of the other diffraction gratings. By activating a diffraction grating while the remaining diffraction grating(s) is(are) deactivated, the light can be projected at an image plane that corresponds to the focal distance of the activated diffraction grating, thereby forming an image at the image plane. The activation can involve applying a voltage (e.g., +5V) controlled by a controller. This controller can control the activation of the diffraction gratings, thereby enabling images to be projected at different image planes, which in turn provides the perception of depth.

To illustrate, consider the example of a heads-up display in a vehicle. The heads-up display can be integrated in the vehicle's windshield and includes a light projector that emits light corresponding to image data (e.g., navigational data related to the vehicle and object data related to an object outside of the vehicle) and waveguide combiner that combines this light with environmental light (e.g., from the outside environment received through the windshield). A controller of the heads-up display can receive data indicating a first image plane on which the navigational data is to be projected and a second image plane at which the object data is to be projected. The controller determines a first diffraction grating of an outcoupling HOE of the waveguide combiner corresponding to the first image plane and a second diffraction grating of the outcoupling HOE corresponding to the second image plane. The refresh rate of the heads-up display may be 60 Hz (e.g., a refresh cycle of about 166 ms). As such, during a first time interval of a refresh cycle (e.g., having a length of about 83 ms), the controller can then activate the first diffraction grating by applying a first voltage thereto, while deactivating the second diffraction grating (e.g., by applying no voltage or 0V). The navigational data is then projected at the first image plane during that time interval. During a second time interval of the same refresh cycle (also of length of about 83 ms), the controller can activate the second diffraction grating while deactivating the first diffraction grating. The object data is then projected at the second image plane during the second time interval.

Embodiments of the present disclosure provide several technical advantages. Waveguide combiners are often used in mixed reality systems because of their unique capability to extend the eye box by means of pupil replication This pupil replication decouples the pupil size from the field of view (FOV), which are otherwise inversely linked in other types of projection systems. This advantage means that waveguide combiner-based displays can offer a large eyebox (pupil) together with a large image (FOV). However, one of the constrain of the light propagating into the waveguide, is that the image needs to be collimated (e.g., have no optical power). If the image is not collimated, the different extractions display images with different magnifications, which do not overlap, and generate aberrations. Because the light needs to be collimated at all times inside the waveguide, the projected image distance cannot be changed by refocusing the light engine projector, which is often performed to display the image at different distances and provide depth of field to the viewer. Doing so, first data can be projected at a further distance, when second data can be displayed at shorter distances. This is beneficial for navigation applications, task-oriented applications, or situation awareness applications, for example. In the case of the waveguide combiner, the location of the projected image can be fixed by including some power in an extraction hologram. In such case, the extraction hologram acts as a lens that focuses the image at a specific distance. However, this distance is fixed for conventional system and cannot be changed at will. In comparison, embodiments of the present disclosure provide a solution that uses multiple switchable diffraction gratings (e.g., extraction holograms) that are stacked and characterized by different focal distances to project images at different image planes without the need to multiply the number of waveguides.

FIG. 1 illustrates examples of an optical waveguide combiner 100 with multiple image planes in accordance with an embodiment of the disclosure. The optical waveguide combiner 100 includes a first optical element 110, a substrate 112, and a second optical element 116. The first optical element 110 can receive light 104 emitted by a light projector 108. As an example, the first optical element 110 may be an in-coupling holographic optical element (HOE). The substrate 112 can be transparent and propagate the light 104 received by the first optical element 110 along a propagation path 114 within the substrate 112. The substrate 112 can include an input surface 111 that is coupled to the first optical element 110. Once the light enters the substrate 112, the light is propagated along the propagation path 114 within the substrate 112 by total internal reflection (TIR). The substrate 112 can also include an output surface 113 that is coupled to the second optical element 116. The second optical element 116 may be an out-coupling holographic optical element.

In an example, the second optical element 116 can output the light 104 that was propagated along the propagation path 114 out of the substrate 112. To output the light 104, the second optical element 116 can include diffraction gratings 118A-N coupled to the output surface 113. As used herein, a diffraction grating can be a diffraction grating section or a diffraction grating structure that includes a plurality of diffractive features, such as grating teeth or diffractive features formed using a metamaterial. In an example, a liquid crystal material is used to form the diffractive elements. The diffraction gratings 118A-N are in a stacked arrangement with a first diffraction grating 118A coupled to the output surface 113, a second diffraction grating 118B coupled to the first diffraction grating 118A, and so on. Although FIG. 1 illustrates three diffraction gratings, a different number of diffraction gratings is possible (e.g., at least two and possibly in the hundreds or thousands). Further, although the diffraction gratings are illustrated as being installed along a same direction (e.g., in the X-direction), a different direction and/or a grid installation along different directions are possible.

Each of the diffraction gratings 118A-N can include one or more switchable holograms that can be made of polymer dispersed liquid crystal (PDLC). In addition, each of the diffraction gratings 118A-N can be characterized by different focal distance, and each focal distance can correspond to an image plane. For instance, the diffraction grating 118A can be characterized by a focal distance corresponding to image plane 122A, the diffraction grating 118B can be characterized by a focal distance corresponding to image plane 122B, and the diffraction grating 118C can be characterized by a focal distance corresponding to image plane 122N.

A controller (e.g., controller 217 in FIG. 2) can selectively activate the diffraction gratings 118A-N by controlling one or more voltage sources to apply a voltage to the diffraction gratings 118A-N. If no voltage is applied to a diffraction grating (e.g., a 0V is applied), that diffraction grating may be considered to be inactive (or deactivated, corresponding to an inactive state or deactivated state) and its diffraction efficiency can be 0%. In the deactivated state, the switchable extraction hologram does not interact with the light 104 propagating in the optical waveguide combiner 100. Upon the application of a voltage to a diffraction grating, that diffraction grating can be considered to be activated (e.g., be strictly larger than 0% and all the way up to about 100%, depending on the efficiency of the diffraction grating; corresponding to an active state or an activated state). In the activated state, the diffraction grating extracts the light 104 from the optical waveguide combiner 100 and displays an image 132 at the image plane corresponding focal distance given by the optical power of the activated switchable hologram.

The controller can selectively activate the diffraction gratings 118A-N based on the image planes. The controller may cycle activation of the diffraction gratings 118A-N to provide time-based synchronization or wavelength-based synchronization of the diffraction gratings 118A-N. As illustrated in FIG. 1, during a first time interval (t1), the controller can activate the diffraction grating 118B by controlling a voltage source to apply a voltage to the diffraction grating 118B. During t1, no voltage is applied to any of the other diffraction gratings, so the other diffraction gratings are deactivated. Upon activating the diffraction grating 118B, at least a portion of the light 104 can be output by the diffraction grating 118B to project a first image 132 at the image plane 122B that is at the focal distance associated with the diffraction grating 118B. During a second time interval (t2), the controller can activate the diffraction grating 118A by controlling a voltage source to apply a voltage to the diffraction grating 118A. During t2, no voltage is applied to any of the other diffraction gratings, so the other diffraction gratings are deactivated. Upon activating the diffraction grating 118A, at least a portion of the light 104 can be output by the diffraction grating 118A to project a second image 134 at the image plane 122A that is at the focal distance associated with the diffraction grating 118A.

Figure 2:
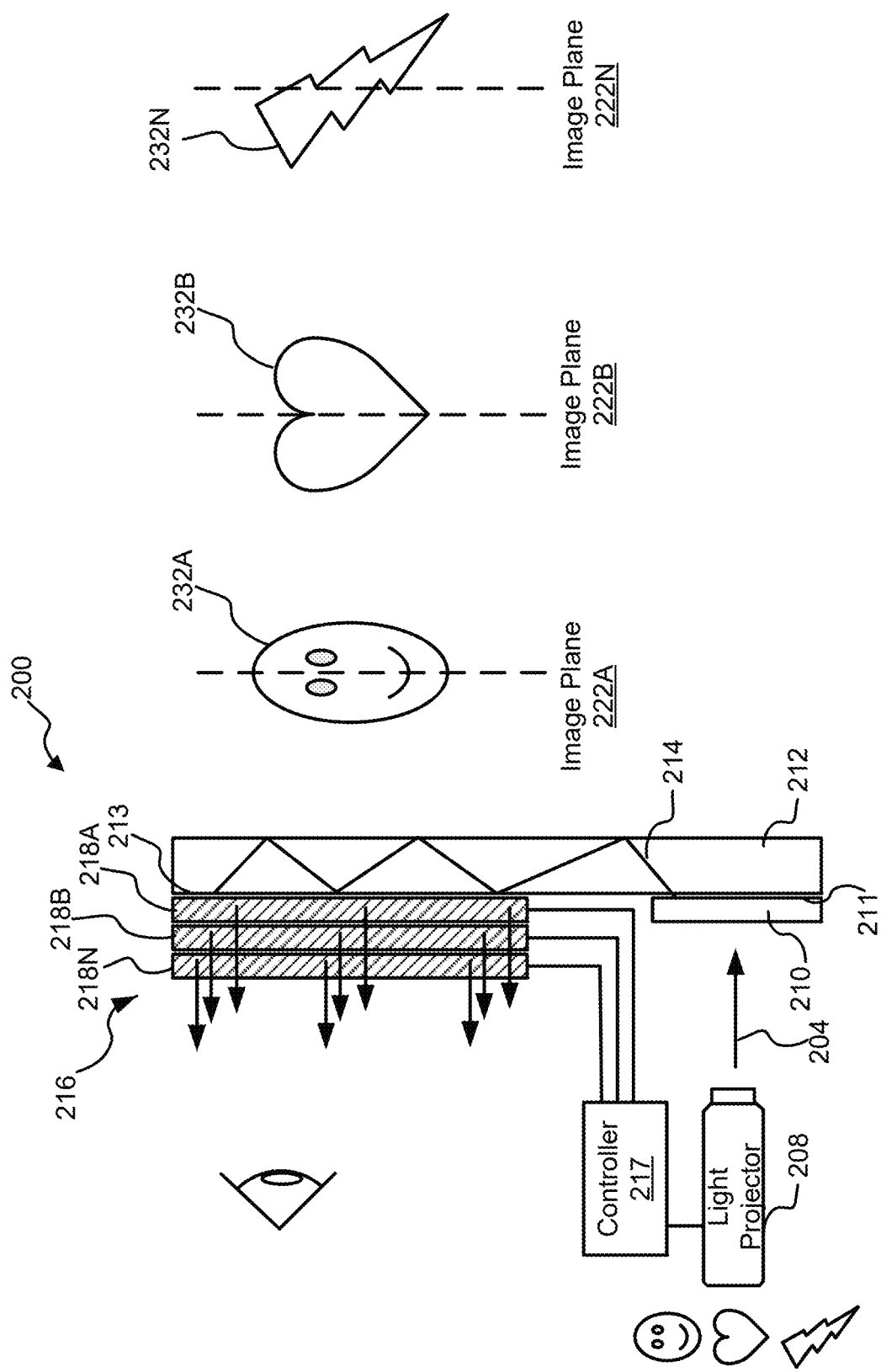
FIG. 2 illustrates examples of time-based synchronization of diffraction gratings of an optical waveguide combiner with multiple image planes in accordance with an embodiment of the disclosure.

FIG. 2 illustrates examples of time-based synchronization of diffraction gratings of an optical waveguide combiner 200 with multiple image planes in accordance with an embodiment of the disclosure. The optical waveguide combiner 200, which can be an example of the optical waveguide combiner 100 of FIG. 1, includes a first optical element 210, a substrate 212, and a second optical element 216. The first optical element 210 can receive light 204 emitted by a light projector 208. As an example, the first optical element 210 may be an in-coupling HOE. The substrate 212 can be transparent and propagate the light 204 received by the first optical element 210 along a propagation path 214 within the substrate 212. The substrate 212 can include an input surface 211 that is coupled to the first optical element 210. Once the light enters the substrate 212, the light is propagated along the propagation path 214 within the substrate 212 by TIR. The substrate 212 can also include an output surface 213 that is coupled to the second optical element 216. The second optical element 216 may be an out-coupling holographic optical element.

In an example, the second optical element 216 can output the light 204 propagated along the propagation path 214. To output the light 204, the second optical element 216 can include diffraction gratings 218A-N coupled to the output surface 213. The diffraction gratings 218A-N are in a stacked arrangement with a first diffraction grating 218A coupled to the output surface 213, a second diffraction grating 218B coupled to the first diffraction grating 218A, and so on. Although FIG. 2 illustrates three diffraction gratings, a different number of diffraction gratings is possible.

Each of the diffraction gratings 218A-N can include one or more switchable holograms that can be made of PDLC. In addition, each of the diffraction gratings 218A-N can be characterized by a different focal distance, and each focal distance can correspond to an image plane. For instance, the diffraction grating 218A can be characterized by a focal distance corresponding to the image plane 222A, the diffraction grating 218B can be characterized by a focal distance corresponding to the image plane 222B, and diffraction grating 218C can be characterized by a focal distance corresponding to the image plane 222N.

A controller 217 can selectively activate the diffraction gratings 218A-N by controlling one or more voltage sources to apply a voltage to the diffraction gratings 218A-N. In the activated state, the switchable hologram extracts the light 204 from the optical waveguide combiner 200 and displays an image 232 at the image plane corresponding focal distance given by the optical power of the activated switchable hologram. That is, image 232A can be associated with light extracted by diffraction grating 218A, image 232B can be associated with light extracted by diffraction grating 218B, and image 232N can be associated with light extracted by diffraction grating 218N.

The controller 217 may receive data from, for example, the light projector 208, indicating any or a combination of the image refresh rate or cycle, the number of images to be projected during the refresh cycle, and the image plane for each image to be projected. The controller 217 may also access from memory data indicating a mapping between image planes and diffraction gratings. Based on the two sets of data, the controller 217 can determine the timing (e.g., a duration of a time interval and its order in a sequence of time intervals) and the diffraction grating to activate for each image projection for a time-based synchronization.

The controller 217 may cycle activation of the diffraction gratings 118A-N to provide the time-based synchronization of the diffraction gratings 218A-N. For the time-based synchronization, the controller 217 can determine the time interval during which each diffraction grating 218 is to be activated and then activate each diffraction grating 218 individually while the other diffraction gratings are deactivated. The time-based synchronization may implement a continuous cycling or a selective smart cycling. Time-based synchronization can provide an impression of depth so that an image can be computed to provide occlusions or transparency from different image planes.

In an example, the continuous cycling involves the controller 217 determining an image refresh rate (e.g., 60 Hz) for displaying images (or, more generally, frames) by the optical system that includes the optical waveguide combiner 200. A refresh cycle can be determined based on the image refresh rate. For example, an image refresh rate of 60 Hz corresponds to a refresh cycle of approximately 166 ms (or 1/60). The controller 217 also determines a number of image planes that the system supports (or equivalently, the number of diffraction gratings in a stacked arrangement). For instance, as illustrated in FIG. 2, the controller 217 may support three image planes (corresponding to "N"). The controller 217 sets a duration of activation for each diffraction grating 118 to equal to an inverse of a multiplication of the image refresh rate by the number of image planes. So, for an image refresh rate of 60 Hz, the controller 217 can set the duration to 1/(60×N), regardless of the number of images that need to be projected. Thus, for three diffraction gratings, the controller 217 can set the duration for the time interval of activation for each diffraction grating to approximately 55 milliseconds (or 1/180).

In an example, selective smart cycling involves the controller 217 determining a number of images ("K") that are to be projected during the refresh cycle. "K" can be smaller than, equal to, or larger than "N." Then, the controller 217 can activate the diffraction gratings corresponding to the image planes on which the images need to be projected while the other diffraction gratings remain deactivated. If an image plane is not to be used during the refresh cycle, the corresponding diffraction grating is not activated during the refresh cycle. So, the activation duration per "to-be-activated" diffraction grating is equal to an inverse of a multiplication of the image refresh rate by the number of images "K." So, for an image refresh rate of 60 Hz, the controller 217 can set the duration to 1/(60×K). For example, if two images are to be displayed during a refresh cycle, one at the image plane 222A and one at the image plane 222B, only diffraction gratings 218A-B need to be activated during that refresh cycle (e.g., diffraction grating 218N is not activated). At an image refresh rate of 60 Hz, the controller 217 can set the duration of the time interval of activation for each of the diffraction gratings 218A-B to be 83 milliseconds (or 1/120).

Figure 3:
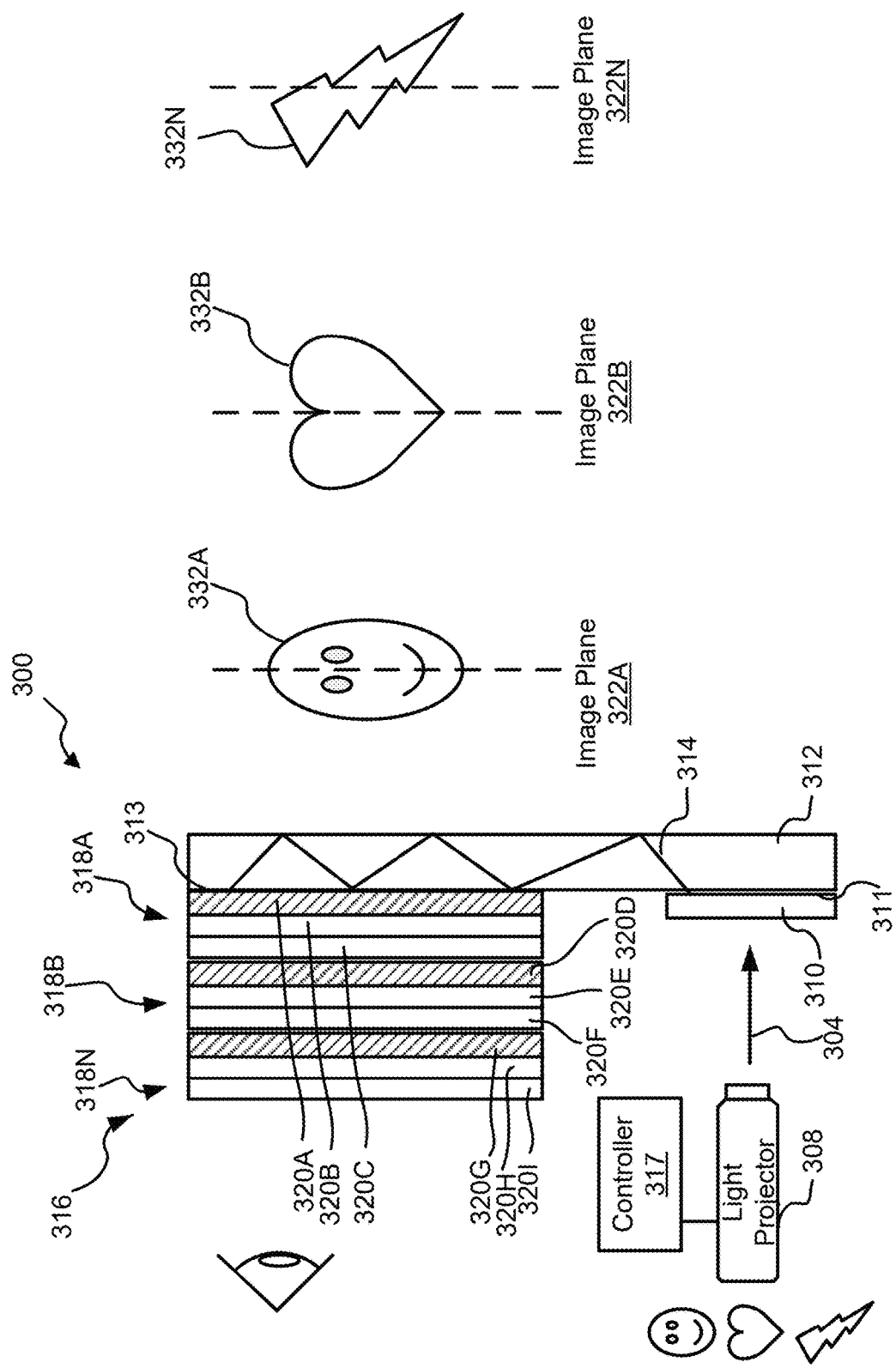
FIG. 3 illustrates an example of wavelength-based synchronization of diffraction gratings of an optical waveguide combiner with multiple image planes in accordance with an embodiment of the disclosure.

FIG. 3 illustrates an example of wavelength-based synchronization of diffraction gratings of an optical waveguide combiner 300 with multiple image planes in accordance with an embodiment of the disclosure. The optical waveguide combiner 300, which can be an example of the optical waveguide combiner 100 of FIG. 1, includes a first optical element 310, a substrate 312, and a second optical element 316. The first optical element 310 can receive light 304 emitted by a light projector 308. As an example, the first optical element 310 may be an in-coupling HOE. The substrate 312 can be transparent and propagate the light 304 received by the first optical element 310 along a propagation path 314 within the substrate 312. The substrate 312 can include an input surface 311 that is coupled to the first optical element 310. Once the light enters the substrate 312, the light is propagated along the propagation path 314 within the substrate 312 by TIR. The substrate 312 can also include an output surface 313 that is coupled to the second optical element 316. The second optical element 316 may be an out-coupling HOE.

In an example, the second optical element 316 can output the light 304 propagated along the propagation path 314. To output the light 304, the second optical element 316 can include diffraction gratings 318A-N coupled to the output surface 313. The diffraction gratings 318A-N are in a stacked arrangement with a first diffraction grating 318A coupled to the output surface 313, a second diffraction grating 318B coupled to the first diffraction grating 318A, and so on. Although FIG. 3 illustrates three diffraction gratings, a different number of diffraction gratings is possible.

Each of the diffraction gratings 318A-N can include one or more switchable holograms 320 that can be made of PDLC. In addition, each of the diffraction gratings 318A-N can be characterized by a different focal distance, and each focal distance can correspond to an image plane. For instance, the diffraction grating 318A can be characterized by a focal distance corresponding to the image plane 322A, the diffraction grating 318B can be characterized by a focal distance corresponding to the image plane 322B, and the diffraction grating 318C can be characterized by a focal distance corresponding to the image plane 322N.

Projection of color images can be achieved by overlaying three extraction holograms within each of the diffraction gratings 318A-N, each extracting a single color from a red-green-blue (RGB) projector. In other words, a diffraction grating includes three extraction holograms, where each extraction hologram extracts one of the colors (e.g., a portion of the light having a wavelength corresponding to the color). The extraction holograms are wavelength selective and interact only with light having a limited bandwidth. So, the optical waveguide combiner 300 can include active RGB extraction holograms for each image plane. The controller 317 can switch the extraction holograms on and off individually, allowing the controller 317 to select which color is imaged at which image plane.

As illustrated, each of the diffraction gratings 318A-N includes three extraction holograms 320, each corresponding to a red, green, or blue diffraction grating. That is, diffraction grating 318A includes extraction holograms 320A-C, diffraction grating 318B includes extraction holograms 320D-F, and diffraction grating 318N includes extraction holograms 320G-H. Extraction hologram 320A, extraction hologram 320D, and extraction hologram 320G can each be a red color extraction hologram. Extraction hologram 320B, extraction hologram 320E, and extraction hologram 320H can each be a green color extraction hologram. Extraction hologram 320C, extraction hologram 320F, and extraction hologram 320I can each be a blue color extraction hologram.

A controller 317 can selectively activate the diffraction gratings 318A-N by controlling one or more voltage sources to apply a voltage to the extraction holograms 320A-I. If no voltage is applied to an extraction hologram (e.g., a 0V is applied), that extraction hologram may be considered to be inactive (or deactivated). Upon the application of a voltage to an extraction hologram, that extraction hologram can be considered to be activated. In the activated state, the extraction hologram extracts the light 304 from the optical waveguide combiner 300 and displays an image 332 at the image plane corresponding focal distance given by the optical power of the activated diffraction grating. That is, image 332A can be associated with light extracted by one or more of the extraction holograms 320A-C of the diffraction grating 318A, image 332B can be associated with light extracted by one or more of the extraction holograms 320D-F of diffraction grating 318B, and image 332N can be associated with light extracted by one or more of the extraction holograms 320G-I of diffraction grating 318N.

In an example, the controller 317 may provide wavelength-based synchronization of the diffraction gratings 318A-N by activating one extraction hologram of one or more of the diffraction gratings 318A-N based on wavelength data. In an example, the wavelength data is received from the light projector 308 and indicates wavelengths (or colors) of images to be projected. This data can also indicate one or more image planes to be used. The controller 317 can access data from memory indicating a mapping between image planes and diffraction gratings and between extraction holograms and wavelengths (or colors) per diffraction grating. Based on the two sets of data, the controller 217 can determine which diffraction grating(s) to activate and, within each to-be-activated diffraction grating, which extraction hologram(s) to also activate.

For example, as illustrated in FIG. 3, the controller 317 can control the voltage source(s) to apply a voltage to the extraction hologram 320A of the diffraction grating 318A, a voltage to the extraction hologram 320D of the diffraction grating 318B, and a voltage to the extraction hologram 320G of diffraction grating 318N. If each of extraction hologram 320A/320D/320G are red color extraction holograms, red images are projected at the image planes 322A-N. Similarly, the controller 317 can control the voltage source(s) to apply a voltage to the extraction hologram 320B of the diffraction grating 318A, a voltage to the extraction hologram 320E of the diffraction grating 318B, and a voltage to the extraction hologram 320H of diffraction grating 318N so that green images can be projected at the image planes 322A-N. Similarly, the controller 317 controls the voltage source(s) to also apply a voltage to the extraction hologram 320C of the diffraction grating 318A, a voltage to the extraction hologram 320F of the diffraction grating 318B, and a voltage to the extraction hologram 320I of the diffraction grating 318N, blue images can be projected at the image planes 322A-N. While one extraction hologram of each diffraction grating is described as being activated, the controller 317 may activate extraction holograms of fewer diffraction gratings in some examples. If all three extraction holograms are activated at the same time for a diffraction grating, an RGB image (e.g., a full color image) can be projected at the corresponding image plane.

In an example, the controller 317 can activate the extraction holograms of a diffraction grating to provide a full color image in an image plane associated with the diffraction grating. This approach can be used in conjunction with the time-based synchronization approach described in FIG. 2. For instance, the controller 317 can control the voltage source(s) to apply a voltage to each of the extraction holograms 320A-C of the diffraction grating 318A to project the image 332A at the image plane 322A. The extraction holograms 320D-I of the diffraction gratings 318B-N can be deactivated during a time interval in which the extraction holograms 320A-C are activated. During another time interval, the extraction holograms 320A-C may be deactivated, and the controller 317 can control the voltage source(s) to apply a voltage to the extraction holograms 320D-F of the diffraction grating 318B and/or the extraction holograms 320G-I of the diffraction grating 318N to project the image 332B at the image plane 322B and/or the image 332N on the image plane 322N.

It may be possible to use the time-based synchronization of FIG. 2 and the wavelength-based synchronization of FIG. 3 in conjunction or independent of each other. For example, an optical system can be operated to provide only time-based synchronization, only the wavelength-based synchronization, or both. When both are provided, an extraction hologram of a diffraction grating can be activated for a time interval during a refresh cycle, and deactivated during another time interval of the refresh cycle.

Figure 4:
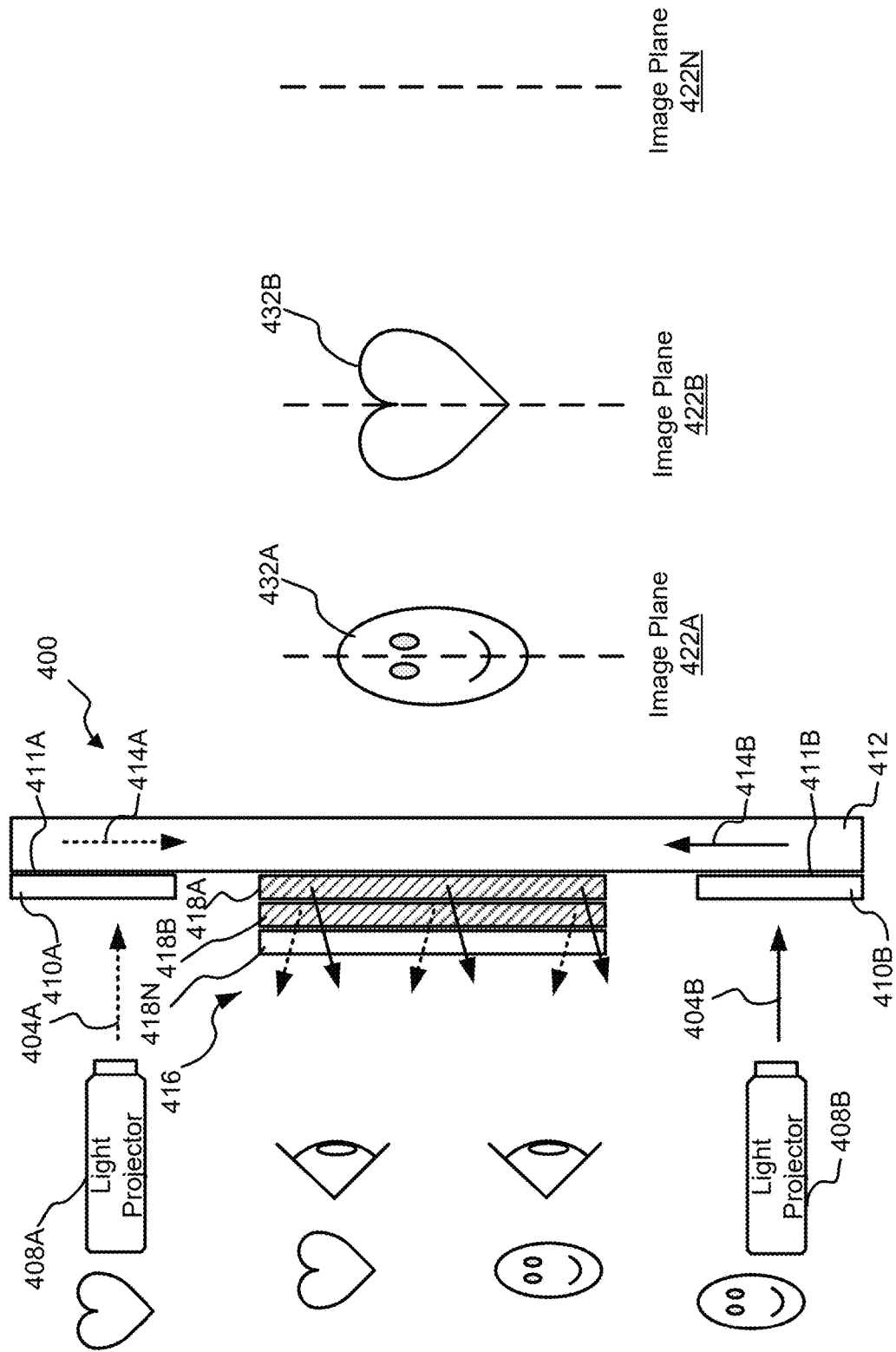
FIG. 4 illustrates an example of an optical waveguide combiner with multiple light projectors in accordance with an embodiment of the disclosure.

FIG. 4 illustrates an example of an optical waveguide combiner 400 with multiple light projectors in accordance with an embodiment of the disclosure. The optical waveguide combiner 400 includes first optical elements 410A-B, a substrate 412, and a second optical element 416. The first optical elements 410A-B can receive light 404A-B emitted by light projectors 408A-B. That is, the first optical element 410A can receive light 404A emitted by the light projector 408A and the first optical element 410B can receive light 404B emitted by the light projector 408B. As an example, the first optical elements 410A-B may be in-coupling HOEs. The substrate 412 can be transparent and propagate the light 404A-B received by the first optical elements 410 along propagation paths within the substrate 112. For instance, the substrate 412 can propagate the light 404A in a first direction 414A and the light 404B in a second direction 414B within the substrate 412. The substrate 412 can include input surfaces 411A-B that are coupled to the first optical elements 410A-B, with the input surface 411A coupled to the first optical element 410A and the input surface 411B coupled to the first optical element 410B. Once the light 404A-B enters the substrate 412, the light 404A-B is propagated along the propagation path within the substrate 412 by TIR. The substrate 412 can also include an output surface that is coupled to the second optical element 416. The second optical element 416 may be an out-coupling HOE.

In an example, the second optical element 416 can output the light 404A-B propagated along the propagation path. To output the light 404A-B, the second optical element 416 can include diffraction gratings 418A-N coupled to the output surface. The diffraction gratings 418A-N are in a stacked arrangement with a first diffraction grating 418A coupled to the output surface, a second diffraction grating 418B coupled to the first diffraction grating 418A, and so on. Although FIG. 4 illustrates three diffraction gratings, a different number of diffraction gratings is possible. The second optical element 416 can be an example of the second optical element 216 of FIG. 2 or the second optical element 316 of FIG. 3.

Each of the diffraction gratings 418A-N can include one or more switchable holograms that can be made of PDLC. In addition, each of the diffraction gratings 418A-N can be characterized by a different focal distance, and each focal distance can correspond to an image plane. For instance, the diffraction grating 418A can be characterized by a focal distance corresponding to the image plane 422A, the diffraction grating 418B can be characterized by a focal distance corresponding to the image plane 422B, and the diffraction grating 418C can be characterized by a focal distance corresponding to the image plane 422N.

A controller (e.g., controller 217 in FIG. 2 or the controller 317 of FIG. 3) can selectively activate the diffraction gratings 418A-N by controlling one or more voltage sources to apply voltages to the diffraction gratings 418A-N. If no voltage is applied to a diffraction grating (e.g., a 0V is applied), that diffraction grating may be considered to be inactive. Upon the application of a voltage to a diffraction grating, that diffraction grating can be considered to be activated. In the activated state, the switchable hologram extracts the light 404A-B from the optical waveguide combiner 400 and displays an image 432 at the image plane corresponding focal distance given by the optical power of the activated switchable hologram.

In FIG. 4, the multiple light projectors can be used to present different images 432A-B to different viewers. The light 404A-B from each of the light projectors 408A-B can be injected toward different directions in the optical waveguide combiner 400 so a specific diffraction grating only interacts with the light coming from a specific direction. By switching on and off different diffraction gratings, it is possible to project images from a specific light projector at a specific distance that is only perceived from a specific location.

In an example, the diffraction grating 418A may output the light 404A in a third direction (e.g., towards a first viewer's eye) and the diffraction grating 418B may output the light 404B in a fourth direction (e.g., towards a second viewer's eye). So, the controller may control the voltage source(s) to apply a voltage to each of the diffraction gratings 418A-B so that images 432A-B are projected at image planes 422A-B. But due to the different directions that the diffraction gratings 418A-B output the light, each viewer may only see one of the images 432A-B. In this example, the first viewer's eye may see the image 432A on the image plane 422A and the second viewer's eye may see the image 432B on the image plane 422B. The projection can use the time-based synchronization approach of FIG. 2 and/or the wavelength-based synchronization approach of FIG. 3.

Figure 5:
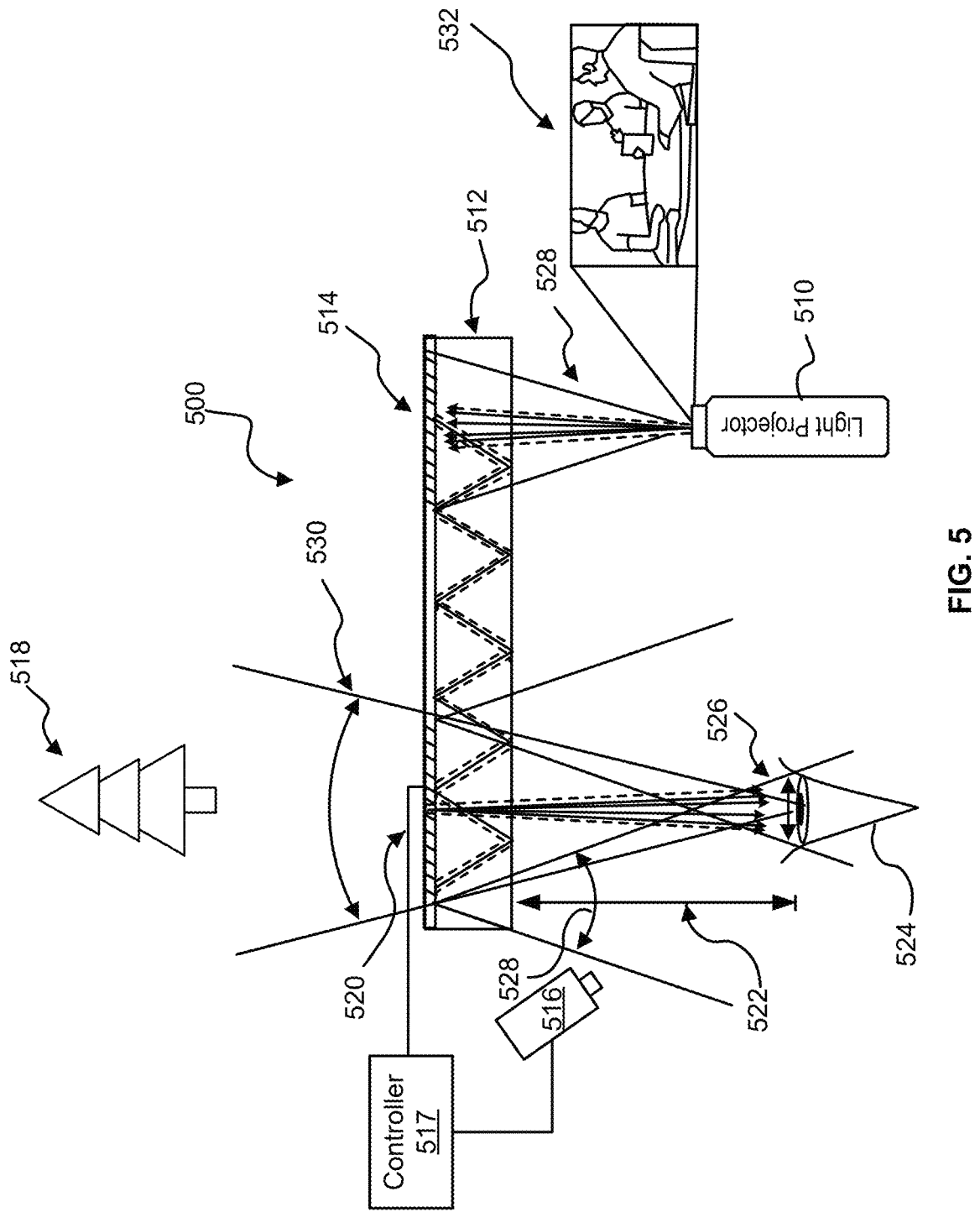
FIG. 5 illustrates a schematic of a system of an optical waveguide combiner with multiple image planes in accordance with an embodiment of the present disclosure.

FIG. 5 illustrates a schematic of a system of an optical waveguide combiner 500 with multiple image planes in accordance with an embodiment of the present disclosure. The optical waveguide combiner 500 can be used in mixed reality display, such as a heads-up display or an augmented reality display, to extend an eyebox 526 by means of pupil replication and to give the perception of depth by means of stacked diffraction gratings. Pupil replication decouples the pupil size from the field of view, which are otherwise inversely linked in other types of mixed reality systems. This advantage means that the optical waveguide combiner based displays can offer a large eyebox together with a large image field of view.

Pupil replication in the optical waveguide combiner 500 can be obtained when the image that is propagating inside the optical waveguide combiner 500 is only partially extracted (or redirected) by an HOE. This HOE can include a stacked arrangement of diffraction gratings to provide a perception of depth. When this happens, the remainder of the light keeps propagating in its original direction inside the optical waveguide combiner 500. The remaining light bounces on the outer surface of the optical waveguide combiner 500 and then interacts again with the HOE, where another portion is extracted (or redirected). Successive extractions of the light replicates the pupil multiple times.

Pupil replication in the optical waveguide combiner 500 can greatly increases the size of the eyebox 526 of the display. However, the light intensity of a single pupil is reduced by the total number of replicated pupils. The luminance of the display at the output of the optical waveguide combiner 500 is equal to the luminance at the injection point divided by the number of replicated pupils. Since a high luminance is better for daylight applications for mixed reality displays, systems using pupil replication may need to have a powerful light source, which may be a challenge for thermal management, size, and electrical power consumption. Therefore, there is an advantage to increasing the eyebox 526 without reducing the luminance of the display or increasing the electrical power consumption.

The optical waveguide combiner 500 can be built using waveguide holography. This technique uses an in-coupling HOE 514 to trap auxiliary content 532 inside a substrate 512 through TIR. The auxiliary content 532 can be generated by a light projector 510 (e.g., a light engine configured as a light source). In the substrate 512, the auxiliary content 532 propagates away from the light projector 510 and is out-coupled toward a viewer's eye 524 by an out-coupling HOE 520. This HOE 520 can include one or more stacked arrangements of diffraction gratings to provide a perception of depth. An HOE represents a functional diffractive structure that transforms the waveform of the input beam into an output beam. A volume holographic element (VHOE) is a type of holographic optical element that operates in the Bragg diffraction regime. The optical waveguide combiner 500 represents the optical system that includes all the optical elements in the optical path from the exit aperture of the light projector 510 to the plane where light enters the viewer's eye 524. Both the in-coupling HOE 514 and the out-coupling HOE 520 are transparent across the entire visible range except for a percent reduction (depending on different parameters such as the type materials used, thickness, etc.) in transmission across the bandwidth of the broadband RGB light sources. This allows the viewer to see real imagery 518 and the auxiliary content 532. The light projector 510 and the out-coupling HOE 520 emit within a cone of light 528.

Although FIG. 5 illustrates the in-coupling HOE 514 and the out-coupling HOE 520 to be on a same side of the substrate 512, embodiments of the present disclosure are not limited as such. For instance, the in-coupling HOE 514 and the out-coupling HOE 520 can be on opposite sides of the substrate 512. Generally, the in-coupling HOE 514 is coupled to an input surface of the substrate 512 by, for instance, being mounted to and attached to the input surface. Likewise, the out-coupling HOE 520 is coupled to an output surface of the substrate 512 by, for instance, being mounted to and attached to the output surface. The input surface corresponds to a surface where light from the light projector 510 is received. The output surface corresponds to a surface from which light is emitted from the substrate 512.

In an example, the out-coupling HOE 520 can include multiple diffraction gratings that can be individually activated by a controller 517. The diffraction gratings of the out-coupling HOE 520 can be one or more stacks that are arranged laterally on the output surface. Each stack of diffraction gratings can include diffraction gratings in a stacked arrangement as described in FIGS. 1-4. Each diffraction grating in a stack can be characterized by a different focal distance, causing an image to be output at different image planes corresponding to the different focal distances.

An eye tracking device 516 can be coupled to the controller 517 to enable the activation of the diffraction gratings in a particular stack depending on a pupil position. The activation can use a time-based synchronization and/or a wavelength-based synchronization, as previously described herein above. For example, the eye tracking device 516 can generate data indicating the pupil position that can be sent to the controller 517 for activating one or more diffraction gratings. The controller 517 can be electrically coupled with the eye tracking device 516 to receive therefrom the data. The controller 517 can also be electrically coupled with one or more volage sources to control the voltages applied to the stacks of the diffraction gratings, to each diffraction grating in a stack, and/or to each extraction hologram in a diffraction grating. In an example, the controller 517 can control a voltage source (e.g., via a set of switches) to apply a target voltage per diffraction grating. By applying a voltage using the controller 517, liquid crystal molecules of the diffraction gratings align so the perceived index of refraction becomes identical to the host material, thereby changing the index modulation and the resulting diffraction efficiency. When the voltage is switched off, the liquid crystal molecules become randomly oriented, and the perceived index of refraction changes from that of the host material. The index modulation increases as does the diffraction efficiency. Note that depending on the materials used, the opposite controls can be possible: the diffraction appears when the voltage is switched on and disappears when switched off. Further, depending on the materials used, any diffraction efficiency can be achieved within a range (e.g., between 0% and 100%) by controlling the voltage. For instance, at a first voltage (e.g., 3V), a 50% diffraction efficiency may be possible, whereas at a second voltage (e.g., 5V), a 100% diffraction efficiency may be possible.

The eye tracking device 516 can detect either a multi-dimensional gaze of the viewer's eye 524 (e.g., two-dimensional along an X-Y plane, or three-dimensional corresponding to an X, Y, Z coordinate in space). In an example, the eye tracking device 516 can include light emitting diodes or other illumination sources for illuminating the viewer's eye 524. The light emitting diodes may emit light in the infrared frequency band, or in the near infrared frequency band. The eye tracking device 516 can also include an image sensor for capturing images of the viewer's eye 524. The image sensor may be a camera, such as a complementary metal oxide semiconductor (CMOS) camera or a charged coupled device (CCD) camera with either a rolling shutter mechanism or a global shutter mechanism. The camera is not limited to be an IR camera or a depth camera or a light-field camera.

A first illumination source can be positioned with respect to the image sensor so that the image sensor may capture bright pupil images of the viewer's eye 524. As an example, the first illumination source may be positioned coaxially with the image sensor so that light reflected from the retina of the viewer's eye 524 returns back through the pupil towards the image sensor, causing the pupil to appear brighter than the iris surrounding it in images where the first illumination source illuminates the viewer's eye 524. A second illumination source can also be positioned with respect to the image sensor for capturing dark pupil images. For example, the second illumination source may be arranged non-coaxially with (or further away from) the image sensor. In this arrangement, light that is reflected from the retina of the viewer's eye 524 does not reach the image sensor, so the pupil appears darker than the iris surrounding it in images where the second illumination source illuminates the viewer's eye 524. The first illumination source and the second illumination source may alternate turns to illuminate the viewer's eye for each image.

The eye tracking device 516 can also include computing components for processing the images captured by the image sensor. For example, the computing components may be a circuitry that includes one or more processors for executing image processing algorithms. The circuitry may be in communication with the image sensor and the illumination sources via a wired or a wireless connection. For each image, the circuitry may perform image processing for extracting features in the image. For example, the circuitry may execute pupil center cornea reflection eye tracking to determine where the viewer's eye is looking. In pupil center cornea reflection eye tracking, the circuitry can estimate the position of the center of the pupil and the position of the center of a glint caused by reflection of light from the illumination sources at the viewer's eye 524. The circuitry can calculate where the viewer is in space using the glint and where the viewer's eye 524 is pointing using the pupil.

The eye tracking device 516 may be placed next to or below a display viewed by the viewer in an area outside of the eyebox 526, or in any other suitable location relative to the viewer. In an example, the eye tracking device 516 may be part of a heads-up display on a windshield of a vehicle, so the eye tracking device 516 may be positioned so as not to interfere with the field of view of the viewer. It will be appreciated that any number of illumination sources and image sensors may be used for eye tracking, and that such illumination sources and image sensors may be distributed in many different ways relative to displays watched by the viewer.

By using switchable diffraction gratings, it is possible to selectively activate sections of the out-coupling HOE 520, where these sections extract (or redirect) the image propagating inside the optical waveguide combiner 500 (where the image is represented by the light emitted by the light projector 510). Each section can include one or more stacks of diffraction gratings. Also, by using with the eye tracking device 516, it may be possible to know where the viewer's pupil is located in real time. Knowing the user pupil position, it is possible to activate only the diffraction grating section(s) that redirect the image directly to the viewer's eye 524. By activating only the portion of the grating that sends the light toward the viewer's eye 524, a large eye box can be maintained, but the light is efficiently redirected to the viewer's eye 524 without discarding any light. This portion can include a stack of diffraction gratings. By selectively activating the diffraction gratings in the stack, it may also be possible to provide the perception of depth.

The optical waveguide combiner 500 can form the eyebox 526 in the horizontal and vertical directions. The eyebox 526 can correspond to the vertical and horizontal distance where the viewer's pupil receives all the angles emitted by the light projector 510. A large eye box is desirable for accommodating eye movement, physical variation among viewers, and mechanical tolerances. As the viewer's pupil moves outside the eyebox 526, the image becomes degraded. Eye relief 522 is the distance between the substrate surface and the entrance pupil of the viewer's eye 524. For maximum comfort, this distance should be larger than a minimum threshold distance. The field-of-view (FOV) 530 is the angular size of the image determined by the geometric relationship between the size of the out-coupling HOE 520 and the distance between the pupil and the surface of the out-coupling HOE 520.

Waveguide combiners using holographic optical elements can operate in either a transmission mode where the light is diffracted as it passes through the holographic optical element or in a reflection mode where the light is diffracted and returns in the opposite direction after striking the holographic optical element. Such waveguide combiners can be used in near-to-eye (NTE) systems to achieve a particular field of view. Field of view angles can be measured in air and acceptance angles for reflection volume holographic optical element are measured inside the substrate. The relationship between the air and substrate angles is described by Snell's law.

Holographic optical elements operating in reflection mode can be volume holographic optical elements. A reflection volume holographic optical element is capable of in-coupling into substrate modes (light propagating through total internal reflection).

A properly designed optical waveguide combiner 500 can have a high transmission (e.g., at least 80%) of the light from the real imagery 518, a large auxiliary field of view diagonally, vertically and horizontally, a large eye box, and an ability to accept the auxiliary content 532 from broadband light emitting diode RGB inputs. To build such an optical waveguide combiner, several issues can be addressed.

Light projectors are designed to achieve a certain white balance (the ratio between the primary emission wavelengths that provide a natural looking image-white balance is typically expressed in degrees Kelvin of a black body source producing the same spectral distribution). The optical waveguide combiner 500 maintains the white balance of the light projector 510 along the optical path to the viewer's eye 524.

While either transmission or reflection holographic optical element can be implemented in the display to produce a large field of view, reflection holographic optical elements can provide a large horizontal field of view. Transmission holographic optical elements can be used in the optical waveguide combiner 500 when the angular requirements on the field of views are smaller. Both horizontal and vertical field of views can be limited by the distance from the aperture stop of the light projector 510 to the center of the out-coupling HOE 520. In order for NTE glasses to accommodate size, weight, and power restrictions, the size of the light projector 510 should be as small as possible. In some designs, this makes the size of the aperture stop (pupil) as small as five mm in diameter in relation to the desired vertical field of view. In this case, the limitation on vertical field of view can become significant and would need to be expanded. Pupil expansion in the horizontal direction is naturally provided by the waveguide geometry of the optical waveguide combiner 500. This is because the light forming the image experiences multiple bounces in the direction of the out-coupling HOE 520 and multiple light extractions can expand the eyebox. In particular, a portion of the light can be extracted and output by a diffraction grating stack and/or a diffraction grating within a stack of the out-coupling HOE 520.

Although FIG. 5 illustrates an eyebox expansion along one direction, the embodiments of the present disclosure are not limited as such. For example, a multi-dimensional (e.g., two-dimensional) expansion or light redirection are possible. For instance, light can be received by an in-coupling HOE and propagated through a first substrate along a first direction to an out-coupling HOE that includes a plurality of controllably switchable diffraction gratings. One, some, or all of such diffraction gratings can be activated to output at least a portion of the light along a second direction to a second substrate. Another out-coupling HOE disposed at an output surface of the second substrate along the second direction can receive the propagated light. This out-coupling HOE can include a plurality of controllably switchable diffraction grating stacks. At least one diffraction grating stack is activated depending on, for example, a pupil position, by activating and one, some, or all of the diffraction gratings of this diffraction grating stack for a light projection at a corresponding image plane. An example of such multi-dimensional approach is further described in U.S. patent application Ser. No. 17/888,912, "Waveguide Combiner With Dynamic Grating Activation," filed on Aug. 16, 2022, which is incorporated herein by reference in its entirety. Rather than using controllably switchable diffraction gratings at an output surface facing a pupil, controllably switchable diffraction grating stacks can be used according to embodiments of the present disclosure.

Figure 6:
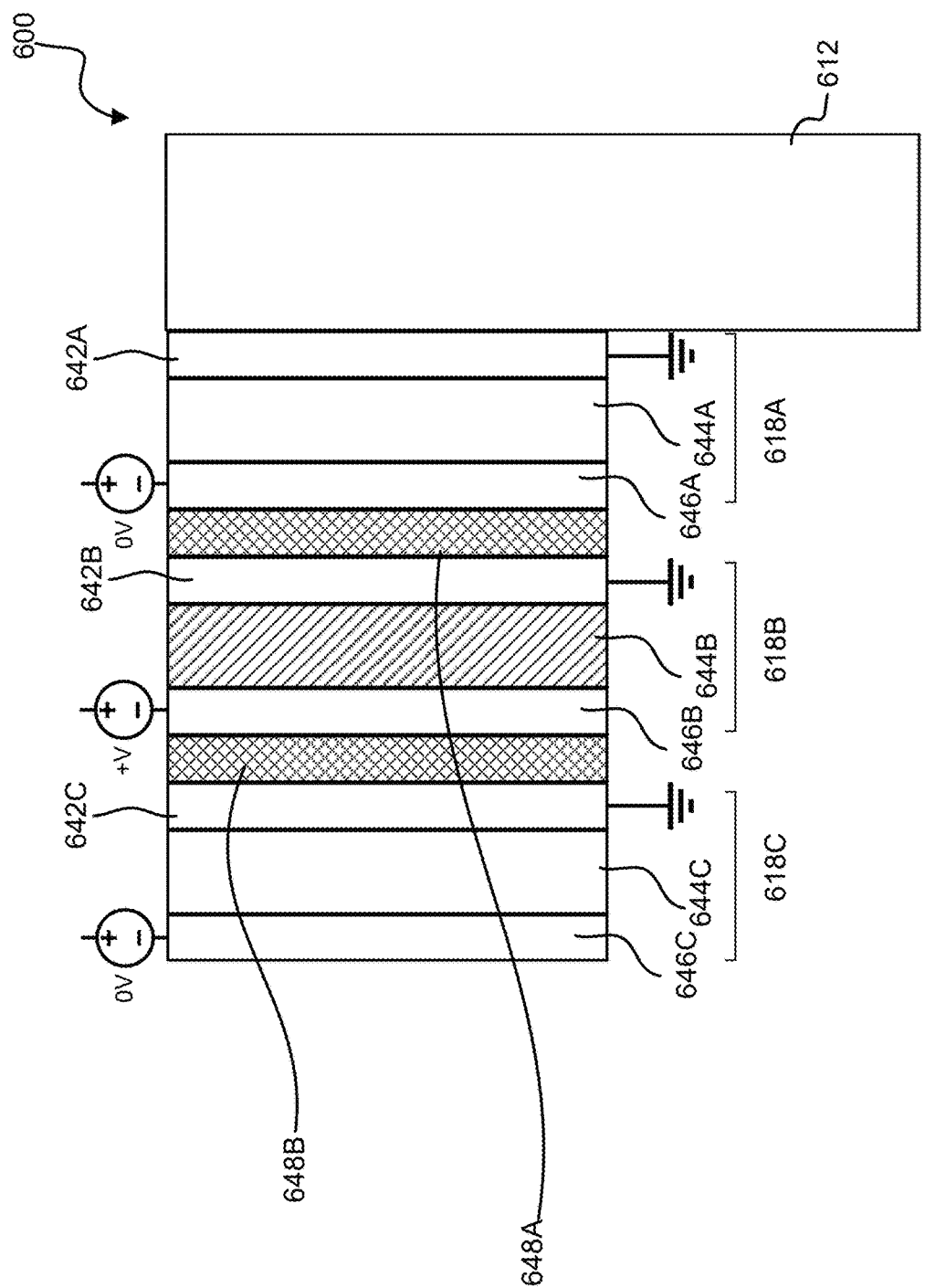
FIG. 6 illustrates an example of an electrode configuration for diffraction grating activation of an optical waveguide combiner in accordance with an embodiment of the present disclosure.

FIG. 6 illustrates an example of an electrode configuration for diffraction grating activation of an optical waveguide combiner 600 in accordance with an embodiment of the present disclosure. The optical waveguide combiner 600 includes a substrate 612 coupled to a stack of diffraction gratings 618. The stack includes diffraction grating 618A coupled to an output surface of the substrate 612, diffraction grating 618B coupled to diffraction grating 618A, and diffraction grating 618C coupled to diffraction grating 618B. Each of the diffraction gratings 618A-C includes a ground electrode 642, a cell 644 coupled to the ground electrode 642, and a polarizing electrode 646 coupled to the cell 644 and to a voltage source (that may be controlled by a controller). The cell 644 includes liquid crystal molecules dispersed in a polymer. The ground electrodes 642A-C can be optically transparent (where this transparency is defined in the human visible wavelength range) such as by being made out of an indium tin oxide layer. Likewise, the polarizing electrodes 646A-C can be optically transparent such as being made out of an indium tin oxide layer.

The optical waveguide combiner 600 also includes insulation layers 648A-B disposed between the polarizing electrode 646 and the ground electrode 642 of the adjacent diffraction grating. As illustrated, insulation layer 648A is disposed between the polarizing electrode 646A of diffraction grating 618A and the ground electrode 642B of diffraction grating 618B. In addition, insulation layer 648B is disposed between the polarizing electrode 646B of diffraction grating 618B and the ground electrode 642C of diffraction grating 618C.

Figure 7:
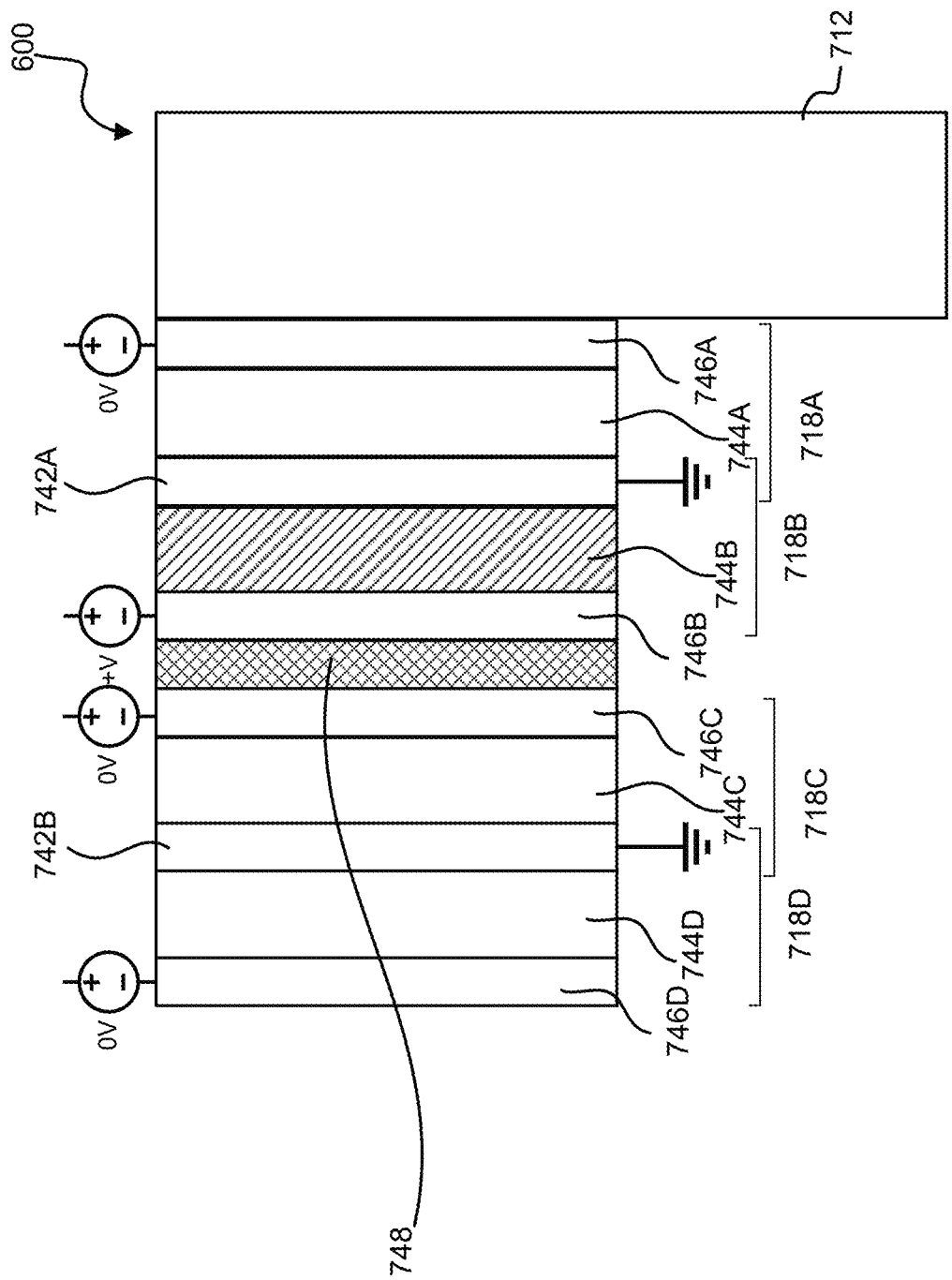
FIG. 7 illustrates another example of an electrode configuration for diffraction grating activation of an optical waveguide combiner in accordance with an embodiment of the present disclosure.

FIG. 7 illustrates another example of an electrode configuration for diffraction grating activation of an optical waveguide combiner 700 in accordance with an embodiment of the present disclosure. The optical waveguide combiner 700 includes a substrate 712 coupled to a stack of diffraction gratings 718. The stack includes diffraction grating 718A coupled to an output surface of the substrate 712, diffraction grating 718B coupled to diffraction grating 718A, diffraction grating 718C coupled to diffraction grating 718B, and diffraction grating 718D coupled to diffraction grating 718C. Each of the diffraction gratings 718A-D includes a polarizing electrode 746 (coupled to a voltage source that may be controlled by a controller) and a cell 744 coupled to the polarizing electrode 746. The cell 744 includes liquid crystal molecules dispersed in a polymer. A ground electrode 742 is disposed between and is common to adjacent diffraction gratings. As illustrated, ground electrode 742A is disposed between and is common to diffraction gratings 718A-B and ground electrode 742B is disposed between and is common to diffraction gratings 718C-D. The ground electrodes 742A-B can be optically transparent (where this transparency is defined in the human visible wavelength range) such as by being made out of an indium tin oxide layer. Likewise, the polarizing electrodes 746A-D can be optically transparent such as being made out of an indium tin oxide layer.

The optical waveguide combiner 700 also includes an insulation layer 748 disposed between pairs of diffraction gratings. The insulation layer 748 is disposed between the polarizing electrode 746B of diffraction grating 718B and the polarizing electrode 746C of diffraction grating 718C. By placing the polarizing electrodes and the ground electrodes head-to-tail to each other, it is possible to reduce the number of insulation layers by half compared to the configuration shown in FIG. 6.

Figure 8:
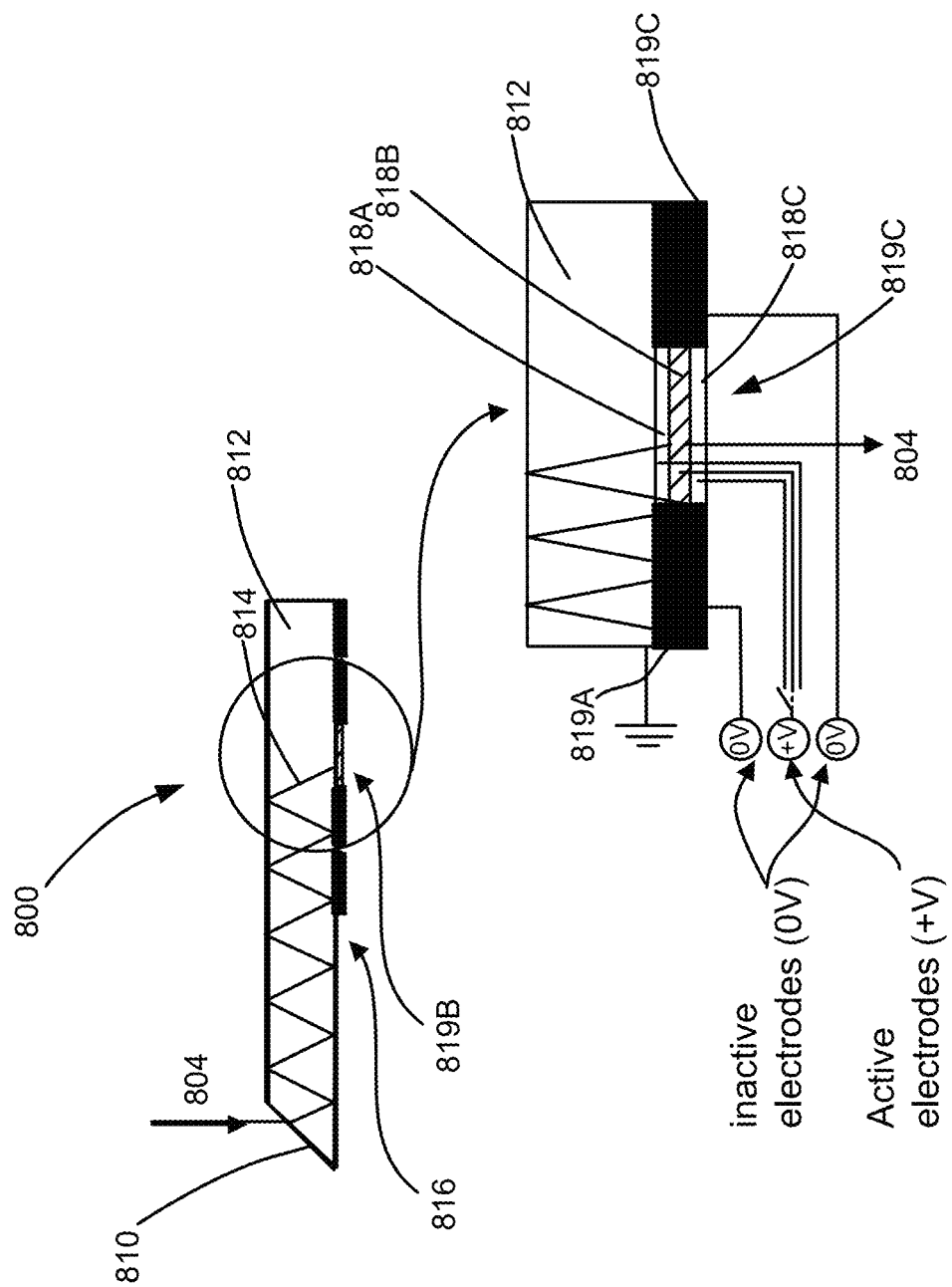
FIG. 8 illustrates an example of components of diffraction gratings of an optical waveguide combiner in accordance with an embodiment of the present disclosure.

FIG. 8 illustrates an example of components of diffraction gratings 818 of an optical waveguide combiner 800 in accordance with an embodiment of the present disclosure. The optical waveguide combiner 800 includes a first optical element 810, a substrate 812, and a second optical element 816. The first optical element 810 can receive light 804 emitted by a light source (e.g., light projector 108 in FIG. 1). The light source may be a light projector. As an example, the first optical element 810 may be an in-coupling holographic optical element. The substrate 812 can be transparent and propagate the light 804 received by the first optical element 810 along a propagation path 814 within the substrate 812. The substrate 812 can include an input surface that is coupled to the first optical element 810 and an output surface that is coupled to the second optical element 816.

In an example, the second optical element 816 can output the light 804 propagated along the propagation path 814. To output the light 804, the second optical element 816 can include diffraction grating stacks 819 in a lateral arrangement on the output surface. Each diffraction grating stack 819 includes diffraction gratings 818 arranged in a stack. Each diffraction can include one or more extraction holograms. As illustrated, each diffraction grating stack 819 can include three diffraction gratings 818.

In an example, each of the diffraction gratings 818 is a liquid crystal diffraction grating.

Liquid crystal molecules in the liquid crystal diffraction gratings can be polarized to achieve a particular diffraction grating structure that has a particular diffraction efficiency.

In an example, a liquid crystal diffraction grating can be formed by using polymer dispersed liquid crystal molecules disposed in a cell (e.g., cells 644 in FIG. 6) that can be polarized (e.g., liquid crystal molecules dispersed in a polymer contained in a glass structure). For the polarization, a first electrically conductive layer and a second electrically conductive layer are attached to opposite sides of the cell (e.g., by being disposed on opposite glass layers between which the polymer containing the liquid crystal molecules is disposed). The first electrically conductive layer can be a ground electrode (e.g., ground electrodes 642 in FIG. 6) that is electrically coupled to a voltage ground, whereas the second electrically conductive layer can be a polarizing electrode (e.g., polarizing electrode 646 in FIG. 6). The ground electrode can be optically transparent (where this transparency is defined in the human visible wavelength range) such as by being made out of an indium tin oxide layer. Likewise, the polarizing electrode can be optically transparent such as being made out of an indium tin oxide layer.

Within each diffraction grating stack 819, each diffraction grating 818 can be a liquid crystal diffraction grating that includes a cell, a ground electrode and a polarizing electrode, where the ground electrode and the polarizing electrode are disposed on opposite sides of the cell (e.g., by being deposited as indium tin oxide layers on glass surfaces of the cell). Adjacent diffraction gratings 818 in a diffraction grating stack 819 may share a common ground electrode (as described in FIG. 7), or each diffraction grating 818 may be coupled to an independent ground electrode (as described in FIG. 6). For the common ground electrode, each diffraction grating 818 can be coupled to a portion of the ground electrode. Regardless of whether a common ground electrode is shared or not, the diffraction gratings 818 do not share polarizing electrodes. Instead, each of the diffraction gratings 818 has its own polarizing electrode. For simplicity, FIG. 8 only shows one polarizing electrode for each diffraction grating stack 819, but the optical waveguide combiner 800 can include a polarizing electrode for each diffraction grating 818.

Each polarizing electrode can be electrically coupled to a voltage source (or the different polarizing electrodes can be coupled to the same voltage source via corresponding switches), so each of the diffraction gratings 818 can have a controllable activation by controlling the voltage applied to its polarizing electrode. An image plane associated with each diffraction grating 818 may be different. That is, diffraction grating 818A may be characterized by a first focal distance associated with a first image plane, diffraction grating 818B may be characterized by a second focal distance associated with a second image plane, and diffraction grating 818C may be characterized by a third focal distance associated with a third image plane. The activation of each of the diffraction gratings 818A-C may be controlled by a controller (e.g., controller 117 in FIG. 1) that applies voltage from the voltage source to the diffraction gratings. So, the controller may apply a voltage to the diffraction grating 818B to project light at the image plane associated with the diffraction grating 818B. If no voltage is applied to a diffraction grating, that diffraction grating may be considered to be inactive. Upon the application of a voltage to a diffraction grating, that diffraction grating can be considered to be activated.

The controller can selectively activate the diffraction gratings 818A-C based on received data indicating which diffraction gratings 818 are to be activated. The controller may store data indicating correspondences between image planes and the diffraction gratings 818A-C or corresponding focal distances. Based on the received data, the controller can determine that an image is to be projected at a particular image plane (e.g., the second image plane). And based on the correspondence between the diffraction grating and the image plane, the controller can determine the diffraction grating to be activated. A set of switches can be disposed in between polarizing electrodes of the diffraction gratings 818A-C and one more voltage source. The relevant switch that couples the determined diffraction grating and a voltage source can be closed to apply voltage to a polarizing electrode.

The controller may additionally selectively activate the diffraction gratings based on a position of a pupil in an eyebox. The controller can receive data generated by an eye tracking device (e.g., eye tracking device 516 in FIG. 5) that indicates the position of the pupil in the eyebox. The controller can then determine which of the diffraction grating stacks 819A-C corresponds to the position of the pupil and activate one or more diffraction gratings in the corresponding diffraction grating stack. For instance, as illustrated (with the dotted line), the diffraction grating 818B of diffraction grating stack 819B is activated, which means the position of the pupil (not shown) corresponds to the diffraction grating stack 819B. So, the controller activates the diffraction grating 818B by applying a voltage to the diffraction grating 818B (e.g., to the corresponding polarizing electrode).

Upon activating the corresponding diffraction grating, at least a portion of the light 804 can be output by the corresponding diffraction grating. That is, once the controller applies the voltage to activate the diffraction grating 818B, at least a portion of the light 804 can be output by the diffraction grating 818B. The other diffraction gratings can remain inactive and not output a portion of the light 804.

Figure 9:
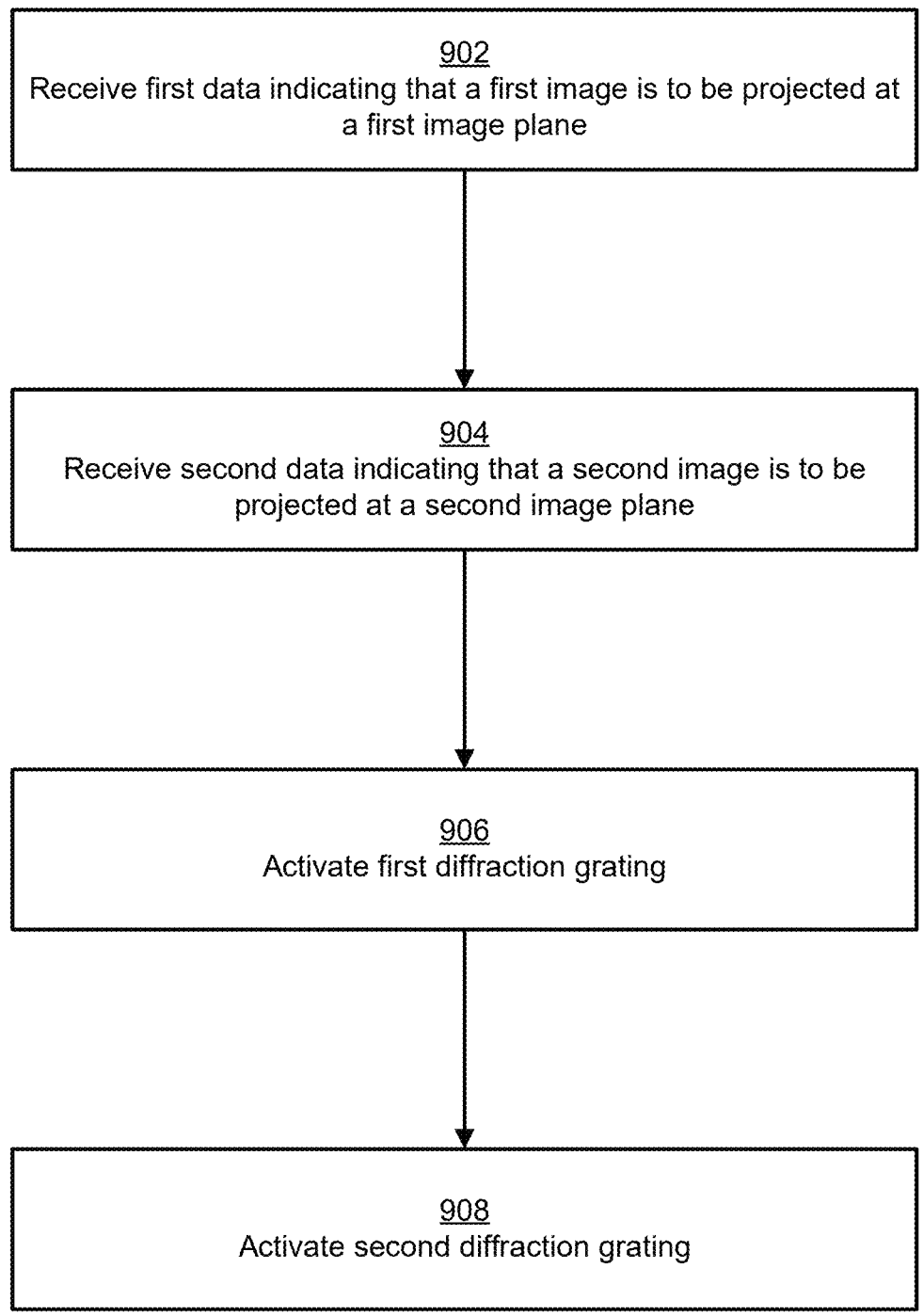
FIG. 9 illustrates an example of a flow for dynamic grating activation for a waveguide combiner in accordance with an embodiment of the present disclosure.

FIG. 9 illustrates an example of a flow for dynamic grating activation for a waveguide combiner in accordance with an embodiment of the present disclosure. A controller (e.g., controller 217 in FIG. 2) is described as performing the operations of the example flow. Instructions for performing the operations of the illustrative flow can be stored as computer-readable instructions on a non-transitory computer-readable medium of the controller. As stored, the instructions represent programmable modules that include code or data executable by a processor(s) of the controller. The execution of such instructions configures the controller to perform the specific operations shown in the figure and described herein. Each programmable module in combination with the processor represents a means for performing a respective operation(s). While the operations are illustrated in a particular order, it should be understood that no particular order is required.

In an example, the flow includes operation 902, where the controller receives first data indicating that a first image is to be projected at a first image plane. The first data may be received from a light projector and indicate the first image plane or a first focal distance to use for the projection. The controller can also determine that a first diffraction grating corresponds to the first image plane. The controller may store a mapping that indicates a correspondence between the first image plane or the first focal distance of the first diffraction grating and the first diffraction grating. Based on the mapping and the first data, the controller can determine that the first diffraction grating is to be activated.

In an example, the flow includes operation 904, where the controller receives second data indicating that a second image is to be projected at a second image plane. The second data may be received from the light projector and indicate the second image plane or a second focal distance to use for the projection. The second focal distance may be different from (e.g., larger than) the first focal distance. The controller can also determine that a second diffraction grating corresponds to the second image plane. The mapping stored by the controller can indicate a correspondence between the second image plane or the second focal distance and the second diffraction grating. Based on the mapping and the second data, the controller can determine that the second diffraction grating is to be activated. The first and second diffraction gratings can be components of an optical element of the optical waveguide combiner and can be in a stacked arrangement.

In an example, the flow includes operation 906, where the controller activates the first diffraction grating. The controller can cause a voltage to be applied to the first diffraction grating to activate the first diffraction grating. With the first diffraction grating activated, at least a portion of light from a light source (e.g., the light projector 108 in FIG. 1) can be output as a first image projected at the first image plane.

In an example, the flow includes operation 908, where the controller activates the second diffraction grating. With the second diffraction grating activated, at least another portion of light from the light source can be output as a second image projected at the second image plane.

In an example, the first diffraction grating is activated during a first time interval while the second diffraction grating is deactivated, and the second diffraction grating is activated during a second time interval while the first diffraction grating is deactivated. In this time-based synchronization, the controller may determine an image refresh rate that is supported and a number of image planes that are supported. The controller can then set the duration of each of the first time interval and the second time interval to equal to an inverse of a multiplication of the image refresh rate by the number of image planes. Or the controller may determine a number of images to be projected during a refresh cycle and set the duration of the first time interval and the second time interval to equal an inverse of a multiplication of the image refresh rate and the number of images.

In another example, the first diffraction grating and the second diffraction grating may be activated during a same time interval during wavelength-based synchronization. Each of the first diffraction grating and the second diffraction grating can include multiple extraction holograms that perform color extraction of a particular range of wavelengths. For instance, the first diffraction grating and the second diffraction grating can each include a red color extraction hologram, a green color extraction hologram, and a blue color extraction hologram. Each extraction hologram can be activated individually, so the controller may activate the red color extraction hologram of the first diffraction grating and the second diffraction grating during a time interval while the green color extraction holograms and the blue color extraction holograms are deactivated.

Figure 10:
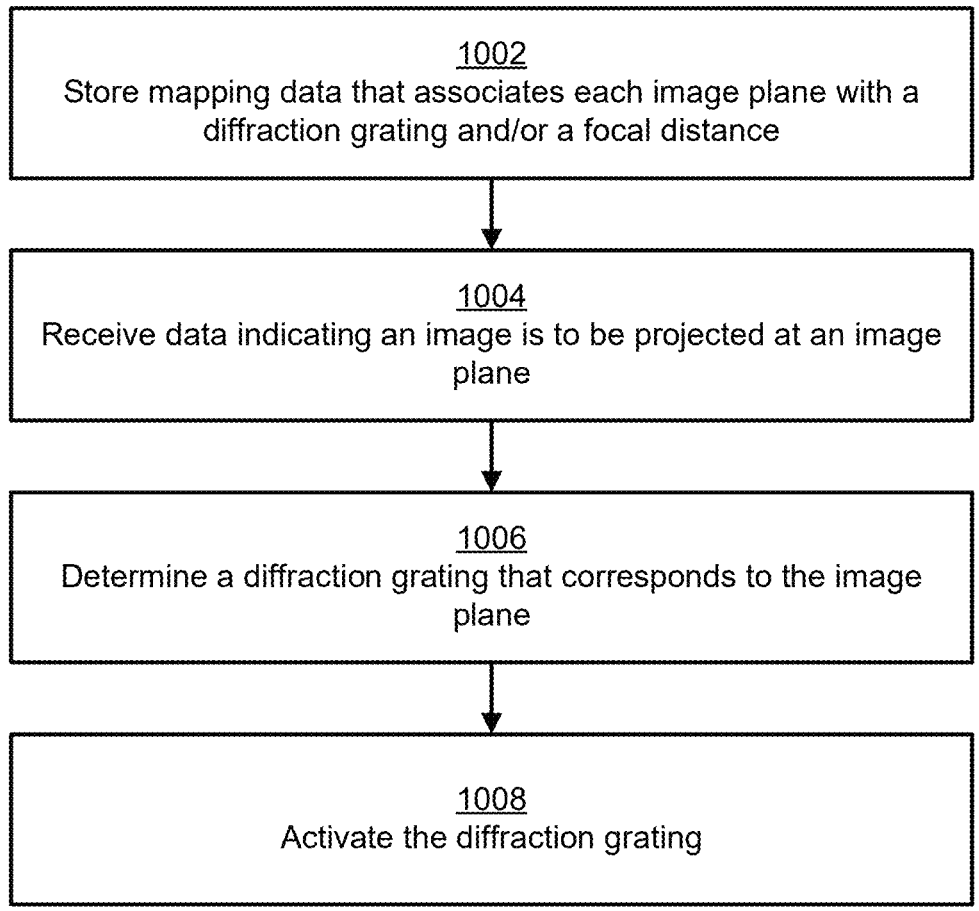
FIG. 10 illustrates an example of a flow for determining grating activation for a waveguide combiner in accordance with an embodiment of the present disclosure.

FIG. 10 illustrates an example of a flow for determining grating activation for a waveguide combiner in accordance with an embodiment of the present disclosure. A controller (e.g., controller 217 in FIG. 2) is described as performing the operations of the example flow. Instructions for performing the operations of the illustrative flow can be stored as computer-readable instructions on a non-transitory computer-readable medium of the controller. As stored, the instructions represent programmable modules that include code or data executable by a processor(s) of the controller. The execution of such instructions configures the controller to perform the specific operations shown in the figure and described herein. Each programmable module in combination with the processor represents a means for performing a respective operation(s). While the operations are illustrated in a particular order, it should be understood that no particular order.

In an example, the flow includes operation 1002, where the controller stores a mapping that associates each image plane with a diffraction grating and/or a focal distance. For instance, a first diffraction grating may be characterized by a first focal distance and a second diffraction grating may be characterized by a second focal distance. The image planes that correspond to the focal distances can thus be mapped based on the focal distances or based on the associated diffraction gratings. Based on the mapping and the first data indicating the first image plane, the controller can determine that the first diffraction grating corresponds to the first image plane.

In an example, the flow includes operation 1004, where the controller receives data indicating that an image is to be projected at an image plane. The data may indicate a distance from the output surface of the optical waveguide combiner that is associated with the image plane.

In an example, the flow includes operation 1006, where the controller determines a diffraction grating that corresponds to the image plane. The controller can look up the mapping to determine the diffraction grating. As an example, the data may indicate that the image is to be projected at a first image plane and the mapping can indicate that the first image plane corresponds to the first diffraction grating characterized by the first focal distance.

In an example, the flow includes operation 1008, where the controller activates the diffraction grating. The controller can cause a voltage to be applied the diffraction grating to activate the diffraction grating. With the diffraction grating activated, at least a portion of light from a light source (e.g., light projector 108 in FIG. 1) can be output as the image projected at the image plane.

Figure 11:
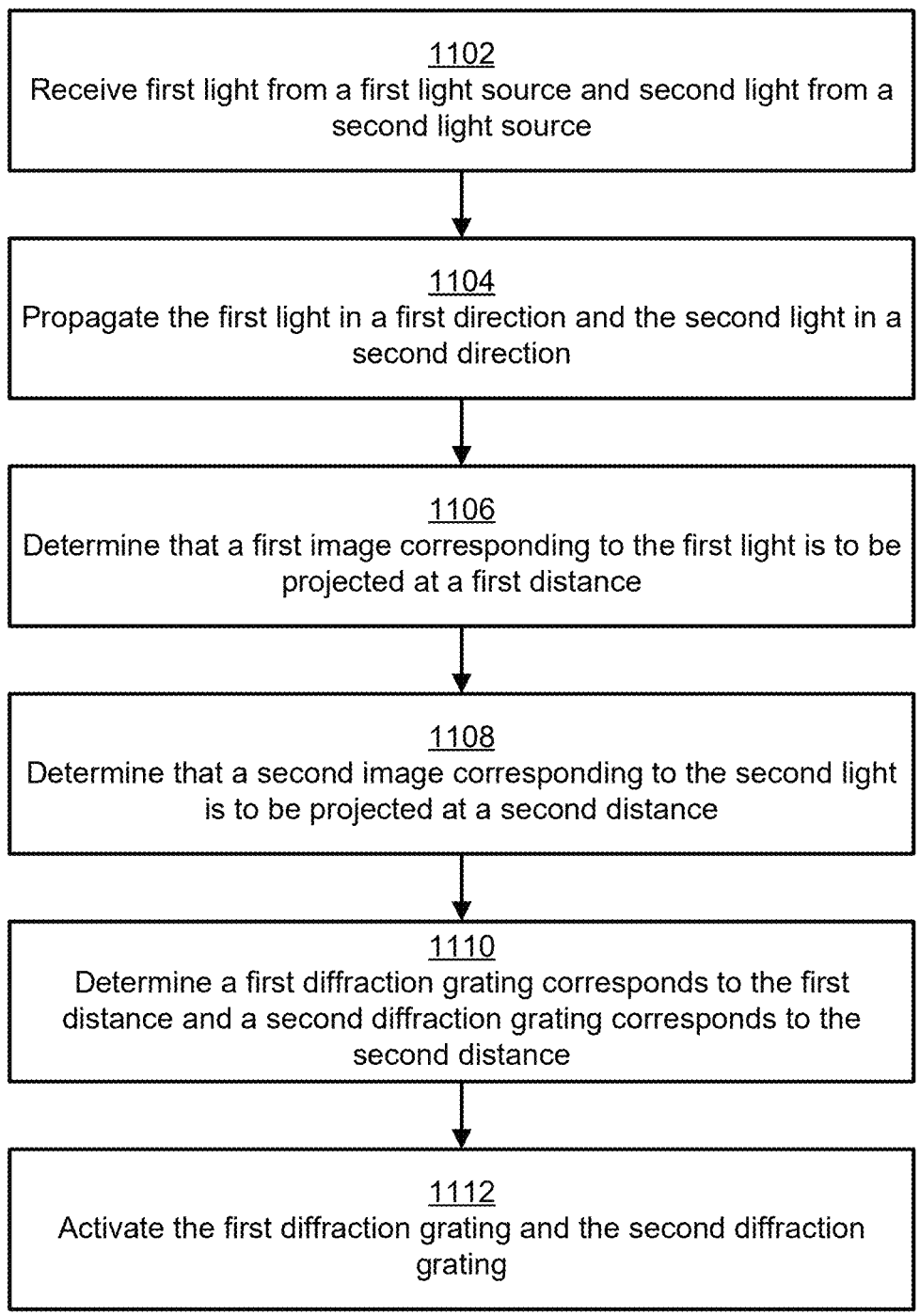
FIG. 11 illustrates an example of a flow for dynamic grating activation for a waveguide combiner with multiple light sources in accordance with an embodiment of the present disclosure.

FIG. 11 illustrates an example of a flow for dynamic grating activation for a waveguide combiner with multiple light sources in accordance with an embodiment of the present disclosure. A system (e.g., the system of FIG. 5) is described as performing the operations of the example flow. Instructions for performing the operations of the illustrative flow can be stored as computer-readable instructions on a non-transitory computer-readable medium of the system. As stored, the instructions represent programmable modules that include code or data executable by a processor(s) of the system. The execution of such instructions configures the system to perform the specific operations shown in the figure and described herein. Each programmable module in combination with the processor represents a means for performing a respective operation(s). While the operations are illustrated in a particular order, it should be understood that no particular order.

In an example, the flow includes operation 1102, where the system receives first light from a first light source and second light from a second light source. Each of the light sources may be a light projector. An in-coupling optical element of an optical waveguide combiner can receive the first light and the second light. The in-coupling optical element can be coupled to a substrate of the optical waveguide combiner.

In an example, the flow includes operation 1104, where the system propagates the first light in a first direction and the second light in a second direction. The substrate can propagate the first light and the second light. As illustrated in FIG. 4, the first light may be received at a top of the substrate and the second light may be received at a bottom of the substrate. So, the substrate can propagate the first light in a downward direction and the second light in an upward direction toward an outcoupling optical element.

In an example, the flow includes operation 1106, where the system determines that a first image corresponding to the first light is to be projected at a first distance. The first distance can correspond to a first image plane and a controller of the system can receive first data indicating that the first image is to be projected at the first image plane.

In an example, the flow includes operation 1108, where the system determines that a second image corresponding to the second light is to be projected at a second distance. The second distance can correspond to a second image plane and the controller can receive second data indicating that the second image is to be projected at the second image plane.

In an example, the flow includes operation 1110, where the system determines a first diffraction grating corresponds to the first distance and a second diffraction grating corresponds to the second distance. The system can look up a mapping that stores correspondences between image planes and diffraction gratings/focal distances. So, the system can look up the first image plane in the mapping to determine that the first diffraction grating corresponds to the first distance ad that the second diffraction grating corresponds to the second distance.

In an example, the flow includes operation 1112, where the system activates the first diffraction grating and the second diffraction grating. The system can apply a voltage to each of the first diffraction grating and the second diffraction grating. The first diffraction grating can be configured to output the first light in a particular direction that is different from a direction in which the second diffraction grating is configured to output the second light.

Figure 12:
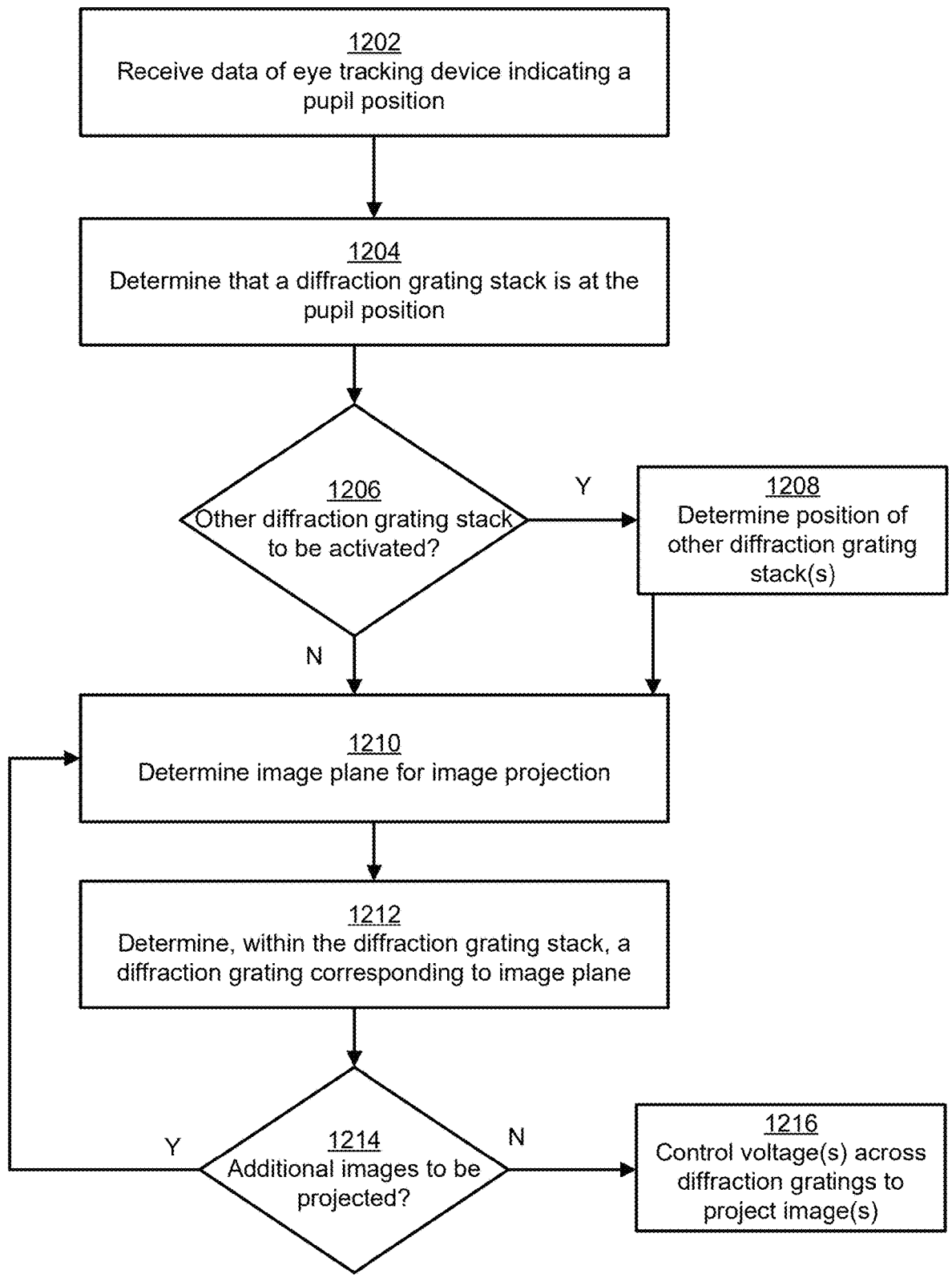
FIG. 12 illustrates an example of a flow for dynamic grating activation for a waveguide combiner with multiple image planes in accordance with an embodiment of the present disclosure.

FIG. 12 illustrates an example of a flow for dynamic grating activation for a waveguide combiner with multiple image planes in accordance with an embodiment of the present disclosure. A controller (e.g., controller 217 in FIG. 2) is described as performing the operations of the example flow. Instructions for performing the operations of the illustrative flow can be stored as computer-readable instructions on a non-transitory computer-readable medium of the controller. As stored, the instructions represent programmable modules that include code or data executable by a processor (s) of the controller. The execution of such instructions configures the controller to perform the specific operations shown in the figure and described herein. Each programmable module in combination with the processor represents a means for performing a respective operation(s). While the operations are illustrated in a particular order, it should be understood that no particular order.

In an example, the flow includes operation 1202, where the controller receives data of an eye tracking device indicating a pupil position. The eye tracking device can monitor the pupil position with an image sensor and send the data continuously or periodically to the controller. The controller and the eye tracking device may be part of a mixed reality system.

In an example, the flow includes operation 1204, where the controller determines that a diffraction grating stack is at the pupil position. Each diffraction grating stack of an optical waveguide combiner can be mapped to a position in an eyebox. Accordingly, the controller can look up mapping data by using the pupil position indicated in the data and the mapping. The result of the look-up can include an identifier of the diffraction grating stack that is associated with the pupil position and that is to be activated.

In an example, the flow includes operation 1206, where the controller determines whether other diffraction grating stacks are to be activated. The controller can determine whether the data also indicates one or more additional positions of other pupils in the eyebox. For each additional pupil, the controller can determine a corresponding diffraction grating stack of the optical waveguide combiner that is to be activated. In some examples, the controller may determine a diffraction grating stack that is adjacent to the diffraction grating stack(s) that are to be activated and additionally determine that the adjacent diffraction grating stacks are to be activated. If other diffraction grating stacks are to be activated, the flow proceeds to operation 1208. Otherwise, the flow proceeds to operation 1210.

In an example, the flow includes operation 1208, where the controller determines position(s) of the other diffraction grating stack(s). The controller can determine the position(s) based on the data indicating the pupil position(s) and the mapping between the diffraction grating stacks and the pupil positions in the eyebox.

In an example, the flow includes operation 1210, where the controller determines, an image plane for image projection. The controller may receive data indicating an image is to be projected at the image plane. The image plane is a particular distance from an output surface of the optical waveguide combiner.

In an example, the flow includes operation 1212, where the controller determines, within the diffraction grating stack, a diffraction grating corresponding to the image plane. Each diffraction grating within the diffraction grating stack can be characterized by a different focal distance corresponding to a different image plane. So based on the data indicating the image plane for image projection, the controller can look up a mapping of image planes to diffraction gratings and/or focal distances to determine the diffraction grating.

In an example, the flow includes operation 1214, where the controller determines whether additional images are to be projected. Additional images are to be projected if the data includes an additional indication of another image that is to be projected at another image plane or if additional data associated with an additional image projection is received. If additional images are to be projected, the flow returns to operation 1210. Otherwise, the flow proceeds to operation 1216.

In an example, the flow includes operation 1216, where the controller controls voltage(s) across diffraction gratings to project images. The controller can apply voltages to each determined diffraction grating to project images to the corresponding image planes. The controller may synchronize activation of diffraction gratings based on time or wavelength.

Figure 13:
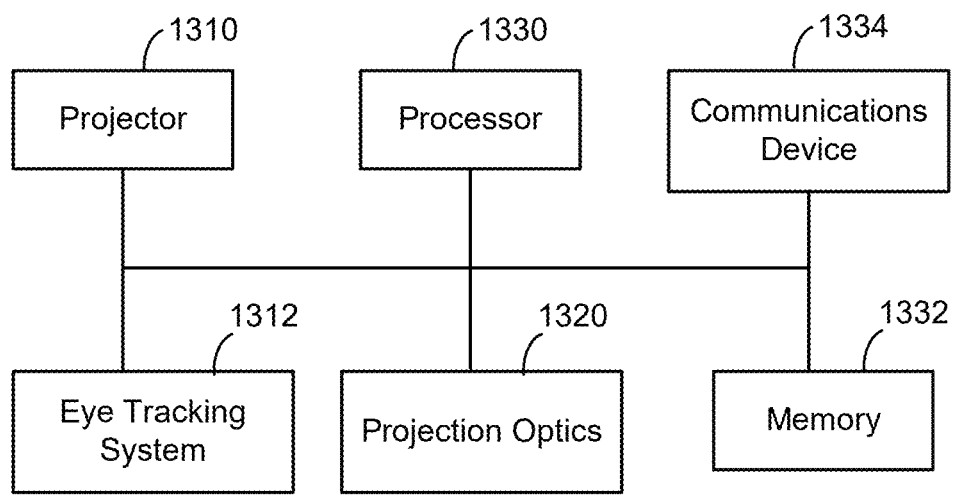
FIG. 13 illustrates a schematic diagram of an image system in accordance with an embodiment of the present disclosure.

FIG. 13 illustrates a schematic diagram of a system 1300 system in accordance with an embodiment of the present disclosure. As illustrated in FIG. 13, the system 1300 supports a mixed reality system or a photonics switch. In an example, the system 1300 includes a projector 1310, which can be implemented as discussed in relation to light projector 108 in FIG. 1, and an eye tracking system 1312. In some embodiments, the eye tracking system 1312 can be implemented to track a pupil position, which can be used to activate a stack of diffraction gratings. The system 1300 can also include projection optics 1320 operable to direct light produced using projector 1310.

The system 1300 additionally includes processor 1330 (e.g., a microprocessor), memory 1332, and communications device 1334. Memory 1332, also referred to as storage media, stores computer-readable instructions of an application, where the computer-readable instructions are executable by processor 1330 to run the application. Additional description related to these elements is provided more fully below.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a light projector;
an optical waveguide combiner comprising:
a first optical element configured to receive light emitted by the light projector;
a substrate configured to propagate the light along a propagation path within the substrate, the substrate comprising an input surface and an output surface; and
a second optical element configured to output the light, the second optical element comprising:
a first diffraction grating coupled to the output surface and characterized by a first focal distance, and
a second diffraction grating coupled to the first diffraction grating in a stacked arrangement and characterized by a second focal distance, the second focal distance being different from the first focal distance and being in a same direction as the first focal distance; and
a controller configured to:
activate, during a first time interval, the first diffraction grating by at least applying a first voltage to the first diffraction grating, wherein the second diffraction grating is deactivated during the first time interval; and
activate, during a second time interval, the second diffraction grating by at least applying a second voltage to the second diffraction grating, wherein the first diffraction grating is deactivated during the second time interval,
wherein a first portion of the light is output by the first diffraction grating during the first time interval as a first image projected at a first image plane that is at the first focal distance, and
wherein a second portion of the light is output by the second diffraction grating during the second time interval as a second image projected at a second image plane that is at the second focal distance.

2. The system of claim 1, wherein the controller is further configured to:
determine an image refresh rate;
determine a number of diffraction gratings in the stacked arrangement; and
set a duration of each of the first time interval and the second time interval to be equal to a first value, wherein the first value is an inverse of a multiplication of the image refresh rate and the number of diffraction gratings.

3. The system of claim 1, wherein the controller is further configured to:
determine an image refresh rate;
determine a number of images to be projected during a refresh cycle; and
set a duration of the first time interval to be equal to an inverse of a multiplication of the image refresh rate and the number of images.

4. An apparatus comprising:
a first optical element configured to receive light;
a substrate comprising an input surface and an output surface and configured to propagate the light along a propagation path within the substrate, wherein the input surface is coupled to the first optical element; and
a second optical element configured to output the light and comprising:
a first diffraction grating coupled to the output surface and characterized by a first focal distance, and
a second diffraction grating coupled to the first diffraction grating in a stacked arrangement and characterized by a second focal distance that is different from the first focal distance.

5. The apparatus of claim 4, further comprising:
a controller configured to:
activate the first diffraction grating based at least in part on a first voltage applied to the first diffraction grating; and
activate the second diffraction grating based at least in part on a second voltage applied to the second diffraction grating.

6. The apparatus of claim 4, further comprising:
a controller configured to:
activate the first diffraction grating while the second diffraction grating is in a deactivated state; and
activate the second diffraction grating while the first diffraction grating is in a deactivated state.

7. The apparatus of claim 4, wherein the first diffraction grating comprises a first plurality of extraction holograms, and wherein the first plurality of extraction holograms comprises:
a red color extraction hologram that is characterized by the first focal distance and configured to be individually activated;
a green color extraction hologram that is characterized by the first focal distance and configured to be individually activated; and
a blue color extraction hologram that is characterized by the first focal distance and configured to be individually activated.

8. The apparatus of claim 4, wherein the first diffraction grating comprises a first plurality of extraction holograms and the second diffraction grating comprises a second plurality of extraction holograms, and wherein the apparatus further comprises:
a controller configured to activate, during a first time interval, one of the first plurality of extraction holograms and one of the second plurality of extraction holograms.

9. The apparatus of claim 8, wherein the controller is further configured to activate, during a second time interval, the first plurality of extraction holograms and deactivate the second plurality of extraction holograms.

10. The apparatus of claim 4, wherein the first diffraction grating comprises: a first ground electrode, a cell coupled to the first ground electrode and including liquid crystal molecules dispersed in a polymer, and a first polarizing electrode coupled to the cell, and wherein an insulation layer is disposed between the first polarizing electrode and a second ground electrode of the second diffraction grating.

11. The apparatus of claim 4, wherein the first diffraction grating comprises: a first polarizing electrode and a cell coupled to the first polarizing electrode and including liquid crystal molecules dispersed in a polymer, and wherein a ground electrode is disposed between and is common to the first diffraction grating and the second diffraction grating.

12. The apparatus of claim 4, wherein the first optical element is a first in-coupling optical element and the light is first light, and wherein the apparatus further comprises:
a first light source configured to emit the first light;
a second light source configured to emit second light;

a second in-coupling optical element coupled to the substrate and configured to receive the second light, wherein:
the substrate is configured to propagate the first light in a first direction and the second light in a second direction,
the first diffraction grating is configured to output the first light in a third direction; and
the second diffraction grating is configured to output the second light in a fourth direction.

13. A method implemented on an apparatus, the method comprising:
receiving light at a first optical element;
propagating the light along a propagation path within a substrate, the substrate comprising an input surface and an output surface, the input surface coupled to the first optical element; and
outputting the light from a second optical element, the second optical element comprising:
a first diffraction grating coupled to the output surface and characterized by a first focal distance;
a second diffraction grating characterized by a second focal distance that is different from the first focal distance, wherein the second diffraction grating and the first diffraction grating are disposed in a stacked arrangement.

14. The method of claim 13, further comprising:
outputting, by the first diffraction grating, first light in a first direction, wherein the first light is output by the first diffraction grating at a first image plane upon the first diffraction grating being activated; and
outputting, by the second diffraction grating second light in a second direction, wherein the second light is output by the second diffraction grating at a second image plane upon the second diffraction grating being activated.

15. The method of claim 13, further comprising:
receiving data indicating a pupil position within an eye-box of the apparatus; and
determining that a diffraction grating stack of a plurality of diffraction grating stacks corresponds to the pupil position, the plurality of diffraction grating stacks disposed in a lateral arrangement, the diffraction grating stack comprising the first diffraction grating and the second diffraction grating, wherein the first diffraction grating is activated based at least in part on the data.

16. The method of claim 13, further comprising:
storing data indicating a first correspondence between a first image plane and at least one of the first diffraction grating or the first focal distance of the first diffraction grating and a second correspondence between a second image plane and at least one of the second diffraction grating or the second focal distance of the second diffraction grating;
selecting, based at least in part on the first correspondence, the first diffraction grating; and
causing, by using the first image plane and the first diffraction grating, an image to be outputted.

17. The method of claim 13, further comprising:
deactivating, during a refresh cycle, the second diffraction grating, wherein the first diffraction grating is activated during a time interval of the refresh cycle.

18. The method of claim 13, further comprising:
deactivating, during a first time interval of a refresh cycle, the second diffraction grating, wherein the first diffraction grating is activated during the first time interval; and
deactivating, during a second time interval of the refresh cycle, the first diffraction grating, wherein the second diffraction grating is activated during the second time interval.

19. The method of claim 13, further comprising:
setting a duration for which the first diffraction grating is to be activated within a refresh cycle based at least in part on a number of images to be projected during the refresh cycle or a number of diffraction gratings in the stacked arrangement.

20. The apparatus of claim 4, wherein the second focal distance is in a same direction as the first focal distance.

* * * * *